(12) United States Patent
Nevison

(10) Patent No.: US 8,991,499 B2
(45) Date of Patent: Mar. 31, 2015

(54) FRACTURING SYSTEM AND METHOD FOR AN UNDERGROUND FORMATION

(75) Inventor: Grant W. Nevison, Bragg Creek (CA)

(73) Assignee: Millennium Stimulation Services Ltd., Calgary (CA)

( * ) Notice: Subject to any disclaimer, the term of this patent is extended or adjusted under 35 U.S.C. 154(b) by 12 days.

(21) Appl. No.: 13/979,816

(22) PCT Filed: Oct. 3, 2011

(86) PCT No.: PCT/CA2011/001113
§ 371 (c)(1),
(2), (4) Date: Sep. 13, 2013

(87) PCT Pub. No.: WO2012/097425
PCT Pub. Date: Jul. 26, 2012

(65) Prior Publication Data
US 2014/0008074 A1    Jan. 9, 2014

Related U.S. Application Data

(60) Provisional application No. 61/433,441, filed on Jan. 17, 2011.

(51) Int. Cl.
*E21B 43/26* (2006.01)
*E21B 43/267* (2006.01)
(Continued)

(52) U.S. Cl.
CPC .............. *E21B 43/26* (2013.01); *E21B 43/267* (2013.01); *E21B 43/168* (2013.01); *E21B 21/062* (2013.01); *C09K 8/62* (2013.01)
USPC ..................... 166/308.2; 166/177.5

(58) Field of Classification Search
CPC ...... E21B 43/267; E21B 43/26; E21B 43/168

USPC ........................................... 166/177.5, 308.2
See application file for complete search history.

(56) References Cited

U.S. PATENT DOCUMENTS 3,063,499 A    11/1962  Allen
3,170,517 A    2/1965   Graham et al.
(Continued)

FOREIGN PATENT DOCUMENTS

CA    1047393        1/1979
CA    2721488 A1    12/2009
(Continued)

OTHER PUBLICATIONS

Canadian Intellectual Property Office: International Search Report & Written Opinion for PCT/CA2011/001114; Jan. 6, 2012; Gatineau, Quebec, CA.
(Continued)

*Primary Examiner* — Nicole Coy
(74) *Attorney, Agent, or Firm* — Jeffrey L. Wendt; The Wendt Firm, P.C.

(57) ABSTRACT

A method for fracturing a downhole formation, includes: preparing an energized fracturing fluid including mixing gaseous natural gas and a fracturing base fluid in a mixer; injecting the energized fracturing fluid through a wellhead and into a well; and continuing to inject the energized fracturing fluid until the formation is fractured. An apparatus for generating an energized fracturing fluid for use to fracture a downhole formation, the apparatus includes: a fracturing base fluid source; a natural gas source; and a mixer for accepting natural gas from the natural gas source and fracturing base fluid from the fracturing base fluid source and mixing the natural gas and the fracturing base fluid to generate the energized fracturing fluid.

20 Claims, 15 Drawing Sheets

(51) Int. Cl.
*E21B 43/16* (2006.01)
*E21B 21/06* (2006.01)
*C09K 8/62* (2006.01)

(56) References Cited

U.S. PATENT DOCUMENTS

| | | | |
|---|---|---|---|
| 3,664,422 A | 5/1972 | Bullen | |
| 3,822,747 A | 7/1974 | Maguire, Jr. | |
| 4,417,989 A | 11/1983 | Hunter | |
| 5,653,287 A | 8/1997 | Wilson et al. | |
| 5,674,816 A | 10/1997 | Loree | |
| 6,302,209 B1 | 10/2001 | Thompson, Sr. et al. | |
| 2006/0065400 A1 | 3/2006 | Smith | |
| 2007/0204991 A1 | 9/2007 | Loree et al. | |
| 2008/0277115 A1 | 11/2008 | Rediger et al. | |
| 2009/0183874 A1* | 7/2009 | Fordyce et al. | 166/280.1 |
| 2009/0301719 A1* | 12/2009 | Bull et al. | 166/280.2 |
| 2010/0044049 A1 | 2/2010 | Leshchyshyn et al. | |

FOREIGN PATENT DOCUMENTS

| | | |
|---|---|---|
| CA | 2639539 A1 | 3/2010 |
| CA | 2649203 A1 | 6/2010 |
| WO | WO2010/025540 A1 | 3/2010 |
| WO | WO2010/130037 A1 | 11/2010 |
| WO | WO2010/130037 A1 | 11/2010 |
| WO | WO2011/000089 A1 | 1/2011 |

OTHER PUBLICATIONS

Canadian Intellectual Property Office: International Search Report & Written Opinion for PCT/CA2011/001112; Jan. 11, 2012; Gatineau, Quebec, CA.

Canadian Intellectual Property Office: International Preliminary Report on Patentability for PCT/CA2011/001112; Jun. 21, 2012; Gatineau, Quebec, CA.

Canadian Intellectual Property Office: International Preliminary Report on Patentability for PCT/CA2011/001114; Jun. 21, 2012; Gatineau, Quebec, CA.

Canadian Intellectual Property Office; International Search Report Written Opinion for PCT/CA2011/001113; Jan. 10, 2012; Gatineau, Quebec, CA.

Canadian Intellectual Property of International Preliminary Report on Patentability for PCT/CA2011/001113; Jun. 21, 2012; Gatineau, Quebec, CA.

United States Patent & Trademark Office; Non-Final Office Action for U.S. Appl. No. 13/979,808 issued Dec. 4, 2014; Alexandria, VA; US.

United States Patent & Trademark Office; Non-Final Office Action for U.S. Appl. No. 13/979,823 issued Nov. 28, 2014; Alexandria, VA; US.

* cited by examiner

FRACTURING SYSTEM AND METHOD FOR AN UNDERGROUND FORMATION

RELATED APPLICATION

This application claims the benefit of U.S. provisional application No. 61/433,441 filed on Jan. 17, 2011 and incorporates the entirety of that application by reference.

FIELD

The invention relates to a fracturing system and method for underground formations and, in particular, to hydraulic fracturing.

BACKGROUND

Hydraulic fracturing is a common technique used to improve production from existing wells, low rate wells, new wells and wells that are no longer producing. Fracturing fluids and fracture propping materials are mixed in specialized equipment then pumped through the wellbore and into the subterranean formation containing the hydrocarbon materials to be produced. Injection of fracturing fluids that carry the propping materials is completed at high pressures sufficient to fracture the subterranean formation. The fracturing fluid carries the propping materials into the fractures. Upon completion of the fluid and proppant injection, the pressure is reduced and the proppant holds the fractures open. The well is then flowed to remove the fracturing fluid from the fractures and formation. Upon removal of sufficient fracturing fluid, production from the well is initiated or resumed utilizing the improved flow through the created fracture system. In some cases, such as recovering natural gas from coal bed methane deposits, proppants are not applied and the simple act of fracturing the formation suffices to provide the desired improvement in production. Failure to remove sufficient fracturing fluid from the formation can block the flow of hydrocarbon and significantly reduce the effectiveness of the placed fracture and production from the well. In order to improve fracture fluid recovery, gases, predominantly nitrogen and carbon dioxide are used in hydraulic fracturing operations.

The use of gases in the fracturing process, particularly carbon dioxide and nitrogen, is common within the industry. By using these gases the liquid component of the fracturing fluid can be reduced or eliminated. With less liquid used in the fracture treatment and the high mobility and expansion of the gas component, the fracturing fluids are much easier to remove. Further, replacement of liquids with gases can provide economic and environmental benefit by reducing the liquid volume needed to complete the fracturing treatment. Generally fracturing compositions using gases can be distinguished as pure gas fracturing (a fluid comprised of nearly 100% gas including carbon dioxide or nitrogen), a mist (a mixture composed of approximately 95% gas (carbon dioxide or nitrogen) carrying a liquid phase), a foam or emulsion (a mixture composed of approximately 50% to 95% gas formed within a continuous liquid phase), or an energized fluid (a mixture composed of approximately 5% to 50% gas in a liquid phase).

The use of nitrogen or carbon dioxide with oil or water based fracturing fluids has been described in the prior art, and can provide a range of benefits. However, in spite of all these benefits, the use of nitrogen or carbon dioxide in fracturing treatments can still have some detrimental effects on the hydraulic fracturing process, create issues during fracture fluid recovery which increase costs and negatively impact the environment.

Other gases have been proposed to gain the benefits attained with adding gases to fracturing fluids while avoiding at least some of the inherent difficulties found with nitrogen and carbon dioxide. Specifically, natural gas has been proposed for use in hydraulic fracturing. Natural gas may be non-damaging to the reservoir rock, inert to the reservoir fluids, recoverable without contamination of the reservoir gas and is often readily available.

However, while the use of natural gas for hydraulic fracturing treatments has been suggested, it is potentially hazardous, and a suitable and safe apparatus and method for hydraulic fracturing using natural gas has not been provided.

SUMMARY

According to one aspect of the invention, there is provided a system for generating an energized fracturing fluid mixture for use to fracture a downhole formation. The system comprises: a fracturing base fluid source; a base fluid pump fluidly coupled to the fracturing base fluid source and configurable to pressurize a base fluid to at least a fracturing pressure of a formation; a liquefied natural gas ("LNG") source; an LNG pump assembly fluidly coupled to the LNG source and comprising a pump component configurable to pressurize LNG to at least the fracturing pressure, and a heater component configurable to heat pressurized LNG to a desired application temperature; and a fracturing fluid mixer. The mixer has a first inlet fluidly coupled to the base fluid pump, a second inlet fluidly coupled to the LNG pump assembly and an outlet for coupling to a wellhead; the mixer is for mixing the base fluid and heated and pressurized natural gas to form a fracturing fluid mixture for injection into the wellhead.

The pump component can further comprise at least one cryogenic centrifugal pump, fluidly coupled to the at least one cryogenic pump; this LNG pump is rated to at least the fracturing pressure of the formation. The heater component can comprise at least one heat exchanger fluidly coupled to the pump component to receive pressurized LNG. The heat exchanger is also thermally coupled to a heat source and is capable of heating the pressurized LNG to at least the desired application temperature. The heater component can be a flameless catalytic heater. The flameless catalytic heater can comprise at least one catalytic element fluidly communicable with and capable of oxidizing a fuel gas to generate heat, and a LNG conduit thermally coupled but fluidly separated from the catalytic element and for flowing LNG therethrough. The flameless catalytic heater can also comprise multiple catalytic elements arranged concentrically around the LNG conduit forming a catalytic bundle for a single pass through of LNG through the flameless catalytic heater.

The mixer can include a main flow line including an inlet end and an outlet end, and an elbow conduit connected to and in fluid communication with the main flow line between the inlet end and the outlet end. The elbow conduit extends at an acute angle from the inlet end and there is a substantially linear flow path through the main flow line. The inlet end is connected to receive flow of the base fluid from the base fluid pump and the elbow conduit is connected to receive flow of the natural gas from the LNG pump assembly.

The LNG source can comprise at least one LNG tank, and the system can further comprises a gaseous natural gas return conduit fluidly coupled to the vaporizer component and the tank for feeding pressurized gaseous natural gas to the tank to pressurize the tank.

The system can further comprise a flare, a flare line conduit fluidly coupled to the flare and a pressure relief valve fluidly coupling the flare line conduit to the tank such that gaseous natural gas in the tank can be vented to the flare. The system can further comprise a cryogenic inert gas source, an inert gas expander liquefaction unit fluidly coupled to the inert gas source and having an inlet valve fluidly coupled to the tank to receive gaseous natural gas from the tank and an outlet valve coupled to tank to deliver LNG to the tank. The inert gas liquefaction unit is configured to allow a cryogenic inert gas to vaporize therein and cause sufficient cooling to liquefy gaseous natural gas therein into LNG. The LNG source can comprise multiple LNG tanks, an intertank vapour line conduit fluidly coupled to each tank, and an intertank liquid line conduit fluidly coupled to each tank.

The fracturing base fluid source can comprise a supply of a fracturing liquid, and optionally at least one of a proppant and a fracturing modifier chemical. The fracturing base fluid source can include at least one of the proppant and the fracturing modifier chemical and the system can further comprise a blender to blend the base fluid and at least one of the proppant and fracturing modifier chemical upstream of the mixer.

According to another aspect of the invention, there is provided a method for fracturing a downhole formation. This method comprises the following steps: providing a base fluid and pressurizing the base fluid to at least a fracturing pressure of the formation; providing liquefied natural gas (LNG) and pressurizing the LNG to at least the fracturing pressure then heating the LNG to a desired application temperature; mixing the pressurized base fluid and pressurized natural gas to form an energized fracturing fluid mixture; injecting the energized fracturing fluid mixture through a wellhead and into a well in communication with the formation; and continuing to inject the energized fracturing fluid mixture until the formation is fractured.

The fracturing base fluid can comprise a fracturing liquid, and optionally at least one of a proppant and a fracturing modifier chemical. The fracturing base fluid can include at least one of the proppant and the fracturing modifier chemical and the method can further comprise blending the fracturing liquid with the at least one proppant and fracturing modifier chemical prior to mixing the base fluid with the natural gas. The energized fracturing fluid can be a foam.

The LNG can be provided from at least one LNG tank and the method can further comprise venting gaseous natural gas in the LNG tank to a flare. The LNG can be provided from at least one LNG tank and the method can further comprise receiving gaseous natural gas from the LNG tank and cooling the gaseous natural gas into LNG by vaporizing a cryogenic inert gas and contacting the vaporized inert gas with the gaseous natural gas.

BRIEF DESCRIPTION OF THE DRAWINGS

Embodiments of the invention will now be described with reference to the accompanying drawings in which.

DETAILED DESCRIPTION

Introduction

Figure 1:
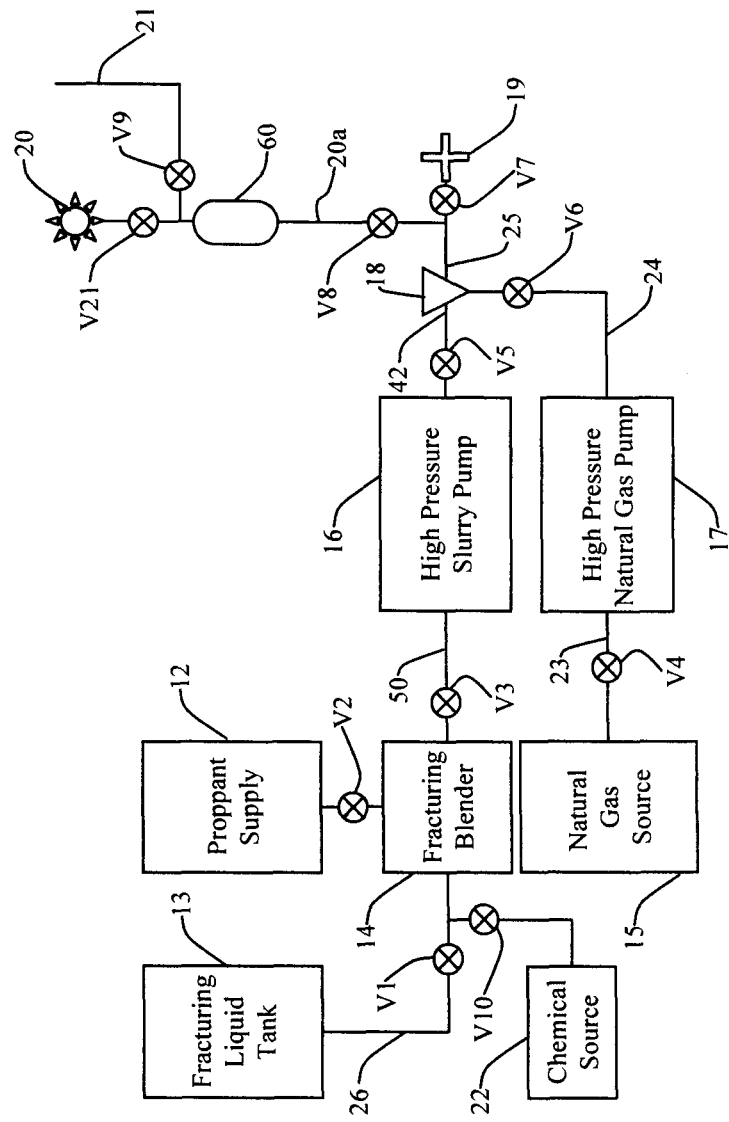
FIG. 1 is a generically depicted schematic of a fracturing system for injecting a fracturing fluid mixture of natural gas and a base fluid into an underground formation according to at least some of the embodiments.

The description that follows, and the embodiments described therein, is provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

The embodiments described herein provide apparatuses, systems and methods for fracturing a formation in a subterranean reservoir with a fracturing fluid mixture comprising natural gas and a base fluid, or with a natural gas-only fracturing fluid. In a first embodiment, a fracturing system is provided which injects a fracturing fluid mixture comprising natural gas and a base fluid, wherein the natural gas is stored as compressed natural gas (CNG) and wherein the base fluid can include a fracturing liquid, a proppant and a viscosifier. In a second embodiment, a fracturing system is provided which injects a fracturing fluid mixture comprising natural gas and a base fluid, wherein the natural gas is stored as LNG and wherein the base fluid can include a fracturing liquid, a proppant and a viscosifier. In a third embodiment, a fracturing system is provided which injects a fracturing fluid consisting only of a natural gas stream. In a fourth embodiment, a fracturing system is provided which injects a fracturing fluid mixture consisting only of a natural gas stream and a proppant. In a fifth embodiment, a fracturing system is provided which injects a fracturing fluid mixture comprising natural gas and a base fluid, wherein the base fluid is free of proppant. In a sixth embodiment, a fracturing system is provided which injects a fracturing fluid mixture comprising natural gas and a base fluid and which includes natural gas venting and purging equipment. Each of these embodiments will be described in greater detail below.

As used in this disclosure, natural gas means methane ($CH_4$) alone or blends of methane with other gases such as other gaseous hydrocarbons. Natural gas is often a variable mixture of about 85% to 99% methane ($CH_4$) and 5% to 15% ethane ($C_2H_6$), with further decreasing components of propane ($C_3H_8$), butane ($C_4H_{10}$), pentane ($C_5H_{12}$) with traces of longer chain hydrocarbons. Natural gas, as used herein, may also contain inert gases such as carbon dioxide and nitrogen in varying degrees though volumes above approximately 30% would degrade the benefits received from this work. CNG refers to compressed natural gas. LNG refers to liquefied natural gas.

A natural gas stream for hydraulic fracturing may be provided as a gas and at pressure and rate sufficient to support the hydraulic fracturing of the subterranean reservoir. The natural gas stream may be blended with a base fluid to form a fracturing fluid mixture, or injected as a pure stream (i.e. without a base fluid) or blended only with a proppant. The base fluid can comprise a fracturing liquid such as a conventional hydrocarbon well servicing fluid, a fracturing liquid containing one or more proppants and/or one more viscosifiers or rheology modifiers such as friction reducers. Hydraulic energy to create the fracture in the subterranean reservoir is obtained from pressurization of the gaseous natural gas and the base fluid mixture at surface at combined rates sufficient to impart the needed energy at the subterranean reservoir. Following the fracture treatment, the natural gas and accompanying fracturing liquid can be recovered and the applied natural gas energizer directed to existing facilities for recovery and sale.

A fracturing system is provided which includes equipment for storing the components of the fracturing fluid mixture, equipment for injecting the natural gas-containing fracturing fluid mixture into a subterranean formation, such as an oil well or a gas well, and equipment for recovering and separating fluids from the well. In some embodiments, the natural gas source is compressed gas (CNG) held in pressurized vessels with a fracturing pump further compressing the natural gas to a suitable fracturing pressure. In other embodiments, the compressed gas is held in pressurized vessels above the fracturing pressure and simply released into the fracturing stream. In some embodiments, the gas source is a vessel containing liquefied natural gas (LNG) with the fracturing pump pressuring the LNG to fracturing pressure and heating the pressurized LNG stream.

Efficient storage of gaseous phase natural gas is achieved at the highest possible pressure which is typically less than 30 MPa (4,400 psi). Pressurization of the natural gas to the extremes typically needed for hydraulic fracturing can be accomplished with the feed in a gaseous phase. Gas phase compressors have been applied to pressures approaching 100 MPa (15,000 psi) which are thus suitable for compressing the natural gas to a suitable fracturing pressure.

Fracturing fluid streams containing natural gas improve fracturing fluid removal from the well and hence post-fracture production performance. Using natural gas avoids fluid incompatibilities often found with the use of carbon dioxide or nitrogen as the energizing fluid. Upon completion of the fracturing treatment, the natural gas component is recovered with the fracturing fluid and the reservoir oil and/or gas. The injected natural gas is recovered within the existing oil and/or gas processing system with little or no disturbance to normal operations. This might eliminate venting or flaring typical to energized fracture treatments as needed to achieve suitable gas composition for sales gas. Further, using natural gas in the fracturing fluid stream may enable application of a locally available gas to gain the benefit of a gasified fracturing fluid stream without the extensive logistics often associated with nitrogen or carbon dioxide.

FIG. 1 is a generic depiction of the main components of the fracturing system according to those embodiments which utilize a fracturing fluid mixture comprising natural gas and a base fluid that may contain a proppant and/or a chemical additive. A fracturing liquid is stored in a fracturing liquid tank (13), proppant is stored in a proppant container (12), and chemical additives such as a viscosifier is stored in a chemical additive container (22). Natural gas is stored in a natural gas container (15) and a natural gas stream is pressurized and supplied by a high pressure natural gas pump (17) and enters a fracturing fluid mixer (18) via a conduit (24). The natural gas stored in container (15) can be compressed natural gas or liquefied natural gas. The high pressure natural gas pump (17) is a compressor if compressed natural gas is the source or a specialized liquefied natural gas fracturing pump if liquefied natural gas is the source. The output from the high pressure natural gas pump (17), regardless of the state of the source gas, is in a gaseous state.

Within the mixer (18), the natural gas stream from conduit (24) is combined with a liquid-phase base fluid stream from conduit (42); this base fluid can comprise the fracturing liquid optionally combined with proppant and the chemical additive. The combined fracturing mixture then enters a well (19) via a conduit (25) where it travels down the wellbore to the reservoir creating the hydraulic fracture using the rate and pressure of the fracturing fluid mixture. Upon applying the desired fracturing materials within the well (19), injection is stopped and placement of the fracturing treatment is complete. Following the fracture treatment and at a time deemed suitable for the well being fractured, the well (19) is opened for flow with the stream directed to a conduit (20a) and then through a separator vessel (60) wherein gases are separated from liquids. Initial flow from the well will be mostly comprised of the injected fracturing materials and the separator vessel (60) is used to separate the injected natural gas from the recovered stream through the conduit (20a). The liquids and solids recovered from separator vessel (60) are directed to tanks or holding pits (not shown). The natural gas from the recovered stream exits the separator (60) and is initially directed to a flare (20) until flow is suitably stabilized, then directed to a pipeline (21) for processing and sale.

In further embodiments, there are provided methods of fracturing a well using a natural gas or a mixture of natural gas and a base fluid. A number of specific methods pertain to safely and reliably applying natural gas in the form of liquefied natural gas. Methods using LNG for on-site storage may permit considerable volumes to be stored efficiently and at pressures as low as atmospheric. As a cryogenic liquid one unit volume of LNG contains approximately six hundred volumes of gas at atmospheric conditions. Thus, fewer storage vessels and a much lower storage and feed pressure with reduced flow volumes is required compared to compressed natural gas. Similarly, pressuring natural gas to the extreme pressures encountered in hydraulic fracturing in liquid form as LNG is exceptionally efficient. Again, as a liquid the volumetric rates are much reduced and relatively incompressible as compared to compressed natural gas, compression heating is eliminated and equipment size and numbers drastically reduced. This significantly reduces the complexity of the operation removing many of the costs and hazards which would be present with known techniques. Further, with fewer pieces of equipment operating at lower pressures with fewer connections between equipment, the needed simplicity for frequent movement of the equipment between wells is supported with LNG use. An inert cryogenic gas at a temperature near or below that of the liquefied natural gas is used to quickly, efficiently and safely pre-cool the natural gas pumper and heater to operating temperature prior to introducing the cryogenic LNG. This eliminates or minimizes use of LNG for cool down thereby avoiding the unnecessary flaring and potential safety issues around cooling the system with the flammable liquefied gas. On-site pressure integrity of the cryogenic liquefied natural gas pumping and heating system is maximized by combining the pumping and heating system on a single unit that is permanently combined. LNG storage tanks are designed to operate under elevated pressures to eliminate or minimize vent gases during storage. The elevated pressure capacity also allows for boost pressurization during LNG withdrawal from the storage tanks at fracturing rates thereby assisting feed to the LNG pumps. As a side stream, vapor from the LNG fracturing pump is directed, as needed to the LNG storage tanks to maintain vessel pressure and create the boost. Energy for heating of the LNG can be acquired in a number of ways, where a preferred embodiment employs heat that is generated without a flame. Such heat for a portable unit can be acquired from the environment, waste or generated heat from internal combustion engine, a catalytic burner or an electric heating element. Alternatively heat can be generated using a flame based heat source local to the heater or remote to the process as dictated by safety requirements.

The embodiments described herein therefore provide for a fracturing system and a method of using the fracturing system and a fracturing fluid mixture to fracture an underground formation. Natural gas used in the fracturing fluid mixture may be readily available at reasonable cost, is environmentally friendly and is commercially recoverable. Its use as a gas phase is beneficial to improve post-fracture oil and gas production while it is also suitable as a substitute for fracturing fluid liquid volumes thereby reducing environmental impact and fracturing costs. The capability to recover the gas through existing production facilities can substantially reduce flaring, save time to placing the well on production and permit immediate gas revenues from the well. Further, the technique is applicable to conventional and unconventional oil and gas wells and suitable for fracturing with hydrocarbon based liquids, water based liquids and acids.

First Embodiment

Figure 2:
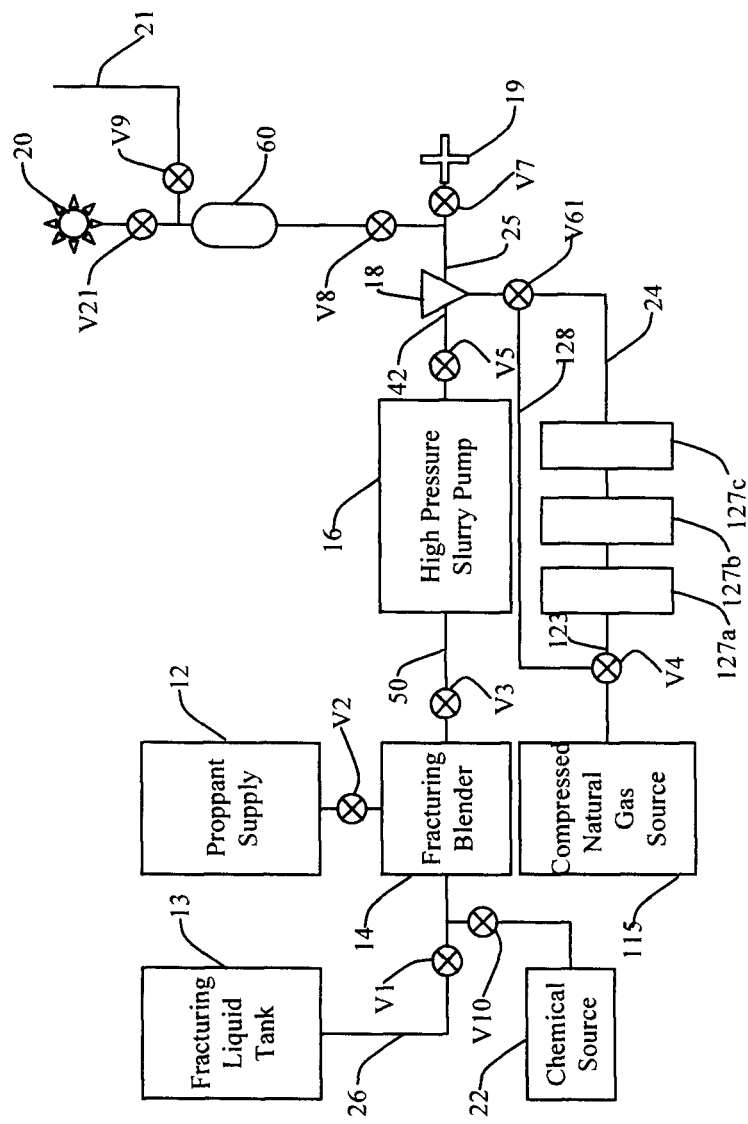
FIG. 2 is a schematic illustrating the main components of a fracturing system as shown in FIG. 1, which includes compressed natural gas storage and supply equipment according to a first embodiment.

Fracturing System Using Fracturing Fluid Mixture Comprising a Base fluid and Natural Gas From a Compressed Natural Gas Source According to a first embodiment and referring to FIG. 2, a system is shown for fracturing a subterranean reservoir penetrated by a well using a fracturing fluid mixture. The fracturing fluid mixture is formed by blending a natural gas stream with a base fluid, wherein the natural gas is from a compressed natural gas source. The base fluid comprises a fracturing liquid and can further comprise viscosifying chemicals and a proppant. More particularly, the fracturing liquid may be any of oil, water, methanol, acid or combinations as desired. The proppant may be natural frac sand or a manufactured particle. The chemical additives will be products as typically applied to create viscosity within the liquid, reduce friction or create beneficial properties as desired.

The main components of the system include a fracturing liquid supply tank, equipment for conveying and prepping the base fluid for combination with a natural gas stream, a natural gas container, equipment for conveying the natural gas stream for combination with the base fluid, a mixer for combining the base fluid and the natural gas stream to form the fracturing fluid mixture and equipment for conveying the fracturing fluid mixture to the wellhead. The specific components of the fracturing system will now be described. A fracturing liquid tank (13) suitable for water or hydrocarbon based liquids is connected via a conduit (26) to a fracturing blender (14) with viscosifying chemicals added via a conduit from chemical additive container (22). The fracturing liquid tanks (13) can be any of those common within the industry for hydraulic fracturing and may apply more than one tank or other suitable arrangement to store sufficient liquid volume. The conduit (26) like all other conduits shown on the FIG. 2, is a pipe or hose rated to the described application and conditions. The blender (14) receives the viscosified fracturing liquid and blends proppant from a proppant supply container (12) with the fracturing liquid to form the base fluid which is now in a slurry form. The blender (14) is a multiple task unit that draws liquids from the fracturing fluids tank with a centrifugal pump (not shown), accepts chemicals from the chemical additive container (22) and mixes them with the fracturing fluid, often within the centrifugal pump.

The fracturing liquid is combined with proppant from proppant supply container (12) in a mixing tub or other mixing device on the blender (14) and then drawn into another centrifugal pump mounted on the blender (14). An example of a typical blending unit is the MT-1060 trailer mounted fracturing blender supplied to the industry by National Oilwell Varco. An example of a proppant supply vessel (12) is the 110 m3 (4,000 cu. ft.) vessels referred to as 'sand kings' capable of delivering 9 tonnes (20,000 lbs) proppant per min.

The created slurry base fluid is then pumped via a conduit from the blender (14) to a high pressure slurry pump (16). The high pressure slurry pump (16) pressurizes the base fluid stream to a suitable fracturing pressure and is connected via a conduit (25) to a fracturing fluid mixer (18). An example of a high pressure fracturing pump is a diesel powered Quintuplex positive displacement pump mounted on a trailer generating up to 1,500 kW or 2,000 HHP. More than one pump may be used as the pump (16). Some of the foregoing components may be combined such as the blender (14) and high pressure slurry pump (16).

In this embodiment, the natural gas source is one or more vessels (15) containing compressed natural gas (CNG). An example of a vessel applied for compressed natural gas transport and storage is the trailer mounted Lincoln Composites' TITAN Tank holding up to 2,500 scm (89,000 scf) of CNG at pressures to 25 MPa (3,600 psi). The CNG storage vessel (15) is connected to a high pressure natural gas compressor pump, herein shown as pumps (127a, 127b, 127c), via conduit (123) with control valve (V4) and is used to compress the gas to the fracturing pressure. Compression may be accomplished by any pump capable of increasing the pressure within a gas stream; for example reciprocating compressors may be applied to achieve high pressure such as that required for hydraulic fracturing. Typically compressors achieve a fixed compression factor, such that multiple stages of compression may be required to attain fracturing pressure. Similarly, in order to achieve the desired rate, a multiple of compressor stages may be applied in parallel. The compressor pump (127a, 127b, 127c) is shown with three compression stages though more or fewer compressor stages may be needed to achieve the desired outlet pressure. Flow of the compressed natural gas from the storage vessel (15) to the high pressure natural gas compressor pumps (127a, 127b, 127c) is controlled with a valve (V4). The compressor pump (127a, 127b, 127c) is connected to the fracturing fluid mixer (18) via conduit (24) with gas control valve (V61). Flow of the pressured natural gas from the high pressure natural gas compressor pumps (127a, 127b, 127c) to the fracturing fluid mixer (18) is controlled with valve (V61). Should the pressure of the compressed gas within the vessel be sufficiently above the fracturing pressure, the gas can be controlled by valves (V4) and (V61) directly to the natural gas slurry stream mixer via conduit (128) and bypassing the high pressure natural gas pump compressors (127a, 127b, 127c) using valve (V4).

Second Embodiment

Figure 3:
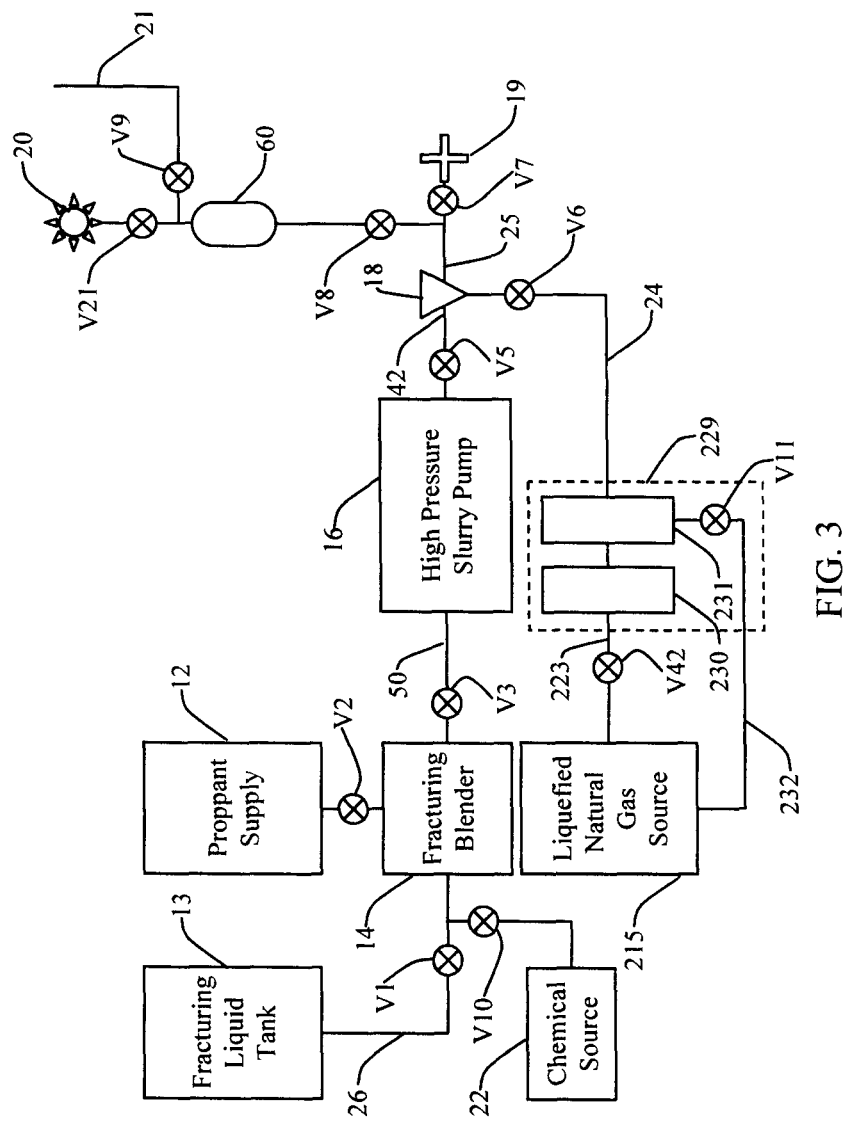
FIG. 3 is a schematic illustrating the main components of a fracturing system as shown in FIG. 1 which includes liquefied natural gas (LNG) storage and supply equipment according to a second embodiment.

Fracturing System Using Fracturing Fluid Mixture Comprising a Base fluid and Natural Gas from a Liquefied Natural Gas Source Referring to FIGS. 3, 10 to 14 and according to a second embodiment, a formation fracturing system is provided which uses a fracturing fluid mixture comprising a base fluid and natural gas from a liquefied natural gas source. In particular, the fracturing system includes an LNG storage and vapor management sub-system for storing LNG and pressurizing and heating the LNG to the application temperature then supplying the natural gas to be mixed with the base fluid. In this embodiment, the LNG is heated to a temperature wherein the natural gas is in a vapour phase; however, it is conceivable in other embodiments that the natural gas can be heated to a temperature wherein the natural gas remains in a liquid phase. FIG. 3 shows the fracturing system of FIG. 1 with such a LNG storage and vapor management sub-system.

In this embodiment, the natural gas source (215) is one or more vessels containing liquefied natural gas (LNG). An example of a vessel applied for natural gas storage is the skid mounted EKIP Research and Production Company LNG Transporter with a capacity of 35.36 m$^3$ (9,336 gal) holding up to 21,000 scm (750,000 scf) of liquid natural gas at pressures to 0.6 MPa (90 psi). LNG is typically stored at atmospheric pressure at a temperature of approximately −162° C. (−260° F.). The LNG storage vessel (215) is connected to high pressure natural gas fracturing pump assembly (229) via LNG supply conduit (223) with supply valve (V42). The high pressure natural gas fracturing pump assembly (229) is arranged to pressure the LNG to the fracturing pressure with pump component (230) and then heat the pressured LNG to compressed gas with heater component (231) of the pump assembly (229). The supply conduit (223) is a fit for purpose LNG conduit such as a 4014SS Cryogenic 50 Series: Cryogenic Hose manufactured by JGB Enterprises Inc.

Replacement for liquid volumes removed from LNG storage vessel (215), is accomplished by directing a stream of the created pressurized gas from heater component (231) through return conduit (232) with control of the stream by return valve (V11). The replacement vapor is controlled to maintain suitable pressure within the LNG vessel (215). Transfer of LNG from the storage vessel (215) to the natural gas fracturing pump assembly (229) is supported by the returning vapor stream in return conduit (232) providing sufficient pressure in the natural gas source (215) to supply the stream of LNG to the inlet of the high pressure natural gas fracturing pump assembly (229). In one configuration the natural gas fracturing pump assembly (229) combines pressurization and heating of the LNG within a single unit, for example, in one housing, on a self contained skid, through one active device, etc. However, these steps can be accomplished on separate units. All components contacted by the LNG must be suitable for cryogenic service. Flow of the pressured natural gas from the natural gas fracturing pump assembly (229) to the natural gas slurry stream mixer (18) is controlled with valve (V6) and through natural gas supply conduit 24.

Figure 10:
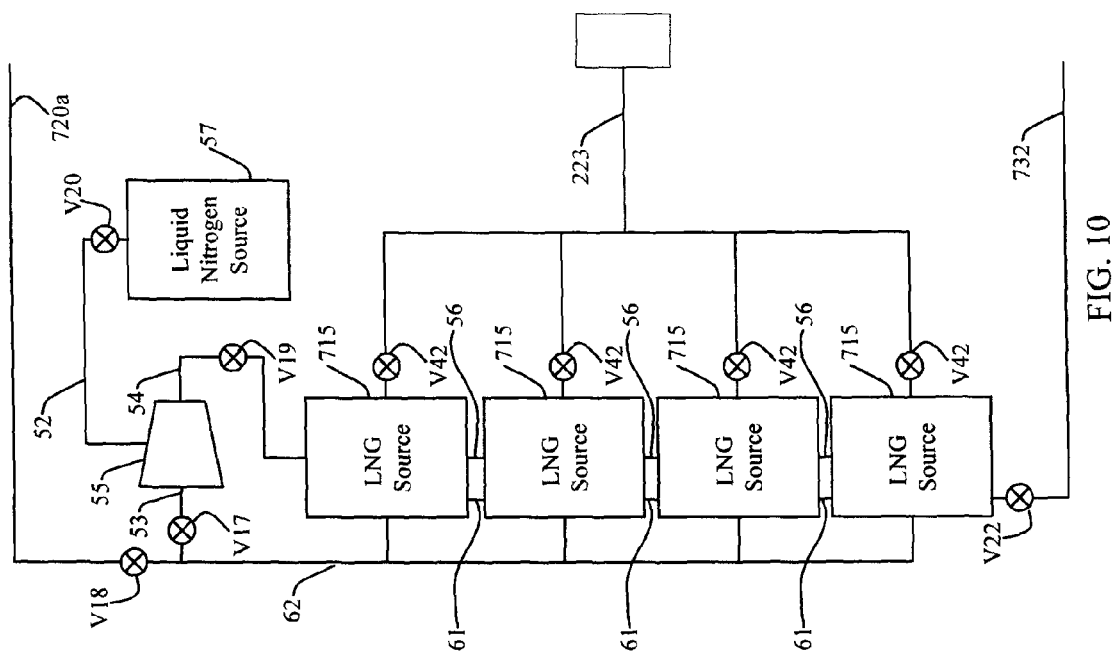
FIG. 10 is a schematic illustrating LNG storage and vapor management equipment used in the second embodiment.
Figure 13:
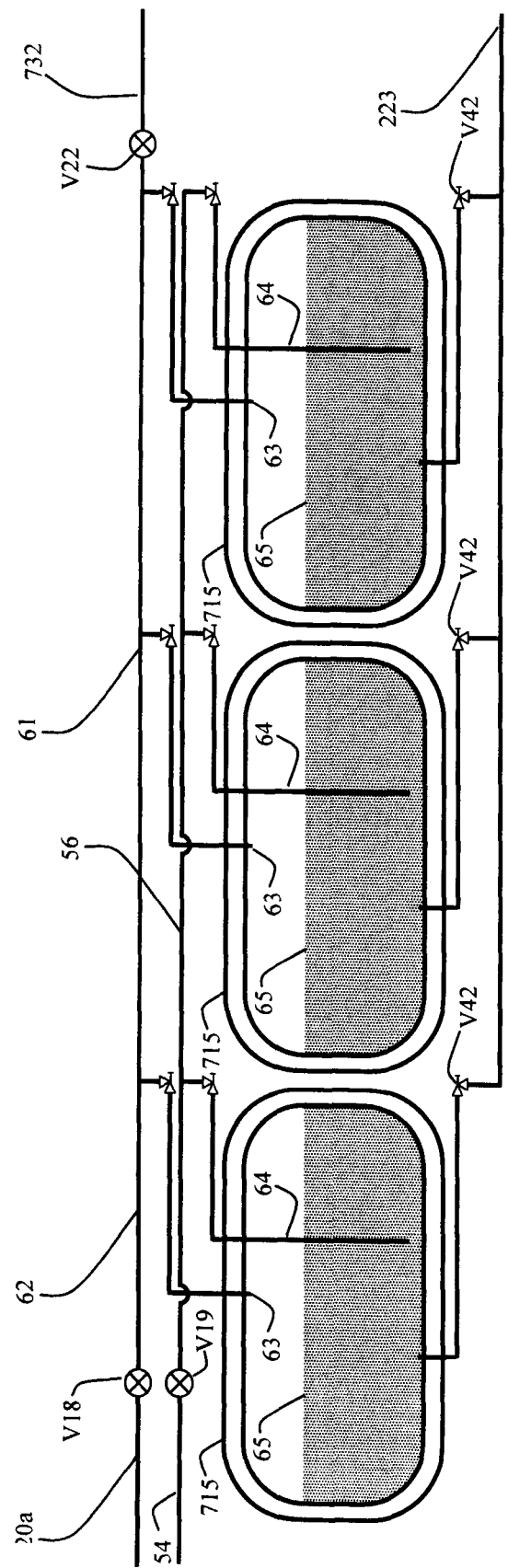
FIG. 13 is a schematic showing a section generally along line I-I of FIG. 10.

Referring to FIGS. 10 and 13, the LNG storage and vapor management sub-system is used to store and manage the LNG used by the fracturing system. Management and control of the LNG storage is needed to maintain a non-hazardous work area while the LNG is stored awaiting use. Under storage at −162° C. (−260° F.) and atmospheric pressure LNG will slowly heat and vaporization of the liquid occurs to maintain its equilibrium state. The generated gases are then by necessity vented from the tank in order to avoid over pressuring.

The LNG storage and vapor management sub-system comprises the LNG source (215) which can be a single or multiple LNG tanks (715). Control of pressure in each of these tanks (715) is accomplished by a pressure relief valve V18 with a relief setting based on the operating design of the tank. The relief valve (V18) is communicative with each tank (715) via a collected vapour conduit (62) and intertank vapour line conduit (61) which in turn is coupled to a vapour line 63 in each tank. In one configuration, relief valve (V18) is connected to a flare line conduit (720a) and then to flare 20 (the connection of conduit 720a to flare 20 not shown in Figures) where released vapors are safely burned.

Alternatively, the collected vapor can be again liquefied and pumped back into the LNG storage tanks (715) creating a safe, efficient and environmentally friendly closed vapor system: collected vapor conduit (62) is diverted to conduit (53) through valve (V17) to a nitrogen expander liquefaction unit (55). A liquid nitrogen source (57) supplies cryogenic nitrogen through nitrogen supply conduit (52) to the nitrogen expander liquefaction unit (55) where vaporization of the nitrogen causes sufficient cooling to re-liquefy the natural gas vapors to LNG. The produced LNG is then pumped through a return conduit (54) into the liquid load line of the LNG source vessels (715); the return conduit (54) also serves to fill the tanks (715) as necessary. The LNG tanks (715) are fluidly interconnected via their liquid load lines (54) via conduit (56) to ensure equal distribution of the LNG between all tanks. Further, the LNG tanks (715) are fluidly interconnected via their vapor lines (63) by conduit (61).

Return conduit 232 from the natural gas fracturing pump assembly 229 is shown as conduit (732) in FIGS. 10 and 13, and serve to return pressurized gaseous natural gas back to the tanks (715) to pressurize the tanks (715) as necessary. Flow from return conduit (732) is controlled using valve (V22) which in turn is coupled to conduit (61).

Liquid natural gas is supplied from the tanks to the natural gas fracturing pump assembly 229 via conduit 223; flow is controlled from each tank by control valve (V42).

In an alternative embodiment, the LNG tanks (715) can be designed to allow pressures as high as 2 MPa (300 psi) before pressure relief is required. When loading these tanks (715) with LNG at normal conditions of −162° C. (−260° F.) the elevated relief pressure will delay venting until temperatures reach levels approaching −110° C. (−166° F.) are reached. With the minimal heat gain imparted by the insulating properties of LNG tanks, venting can be virtually eliminated with normal usage cycles. Additionally, providing elevated relief pressure in the LNG source (55) ensures small errors in pressure maintenance during pumping, vapor from the LNG fracturing pump heater (31), and the desire to boost the internal pressure of the tanks to ensure reliable feed to the natural gas fracturing pump assembly (229) and do not result in opening of pressure relief valves during the fracturing process.

Figure 4:
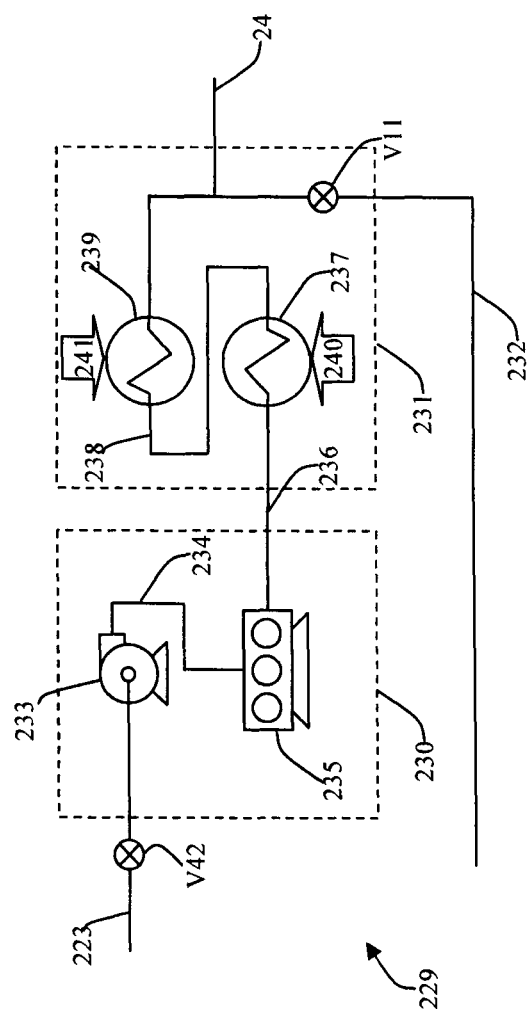
FIG. 4 is a schematic illustrating the main components of an LNG fracturing pump assembly used in the second embodiment.

FIG. 4 is a schematic illustrating the main components of the natural gas fracturing pump assembly (229). LNG is fed to the pump component (230) from supply conduit (223). The pump component comprises a cryogenic centrifugal pump (233), a high pressure LNG pump (235) and a conduit (234) interconnecting the cryogenic centrifugal pump (233) and the LNG pump (235). Adequate feed pressure to the high pressure LNG pump (235) is needed to ensure vapor-lock or cavitation does not occur within the pumping cycle. A single or multiple cryogenic centrifugal pumps (233) may be applied as needed to meet the feed pressure and rate requirement to support the high pressure LNG pump (235). An example of a cryogenic centrifugal pump (233) to provide feed pressure and rate is that of ACD Industries, Boost Pump 2×3×6 providing rates to 1.5 m3/min (2400 gpm) LNG and a pressure head of 95 kPa (15 psi). The high pressure LNG pump (235) is rated to pressurize LNG to at least 35 MPa and up to as high as 100 MPa (15,000 psi) in order to provide sufficient pressure to fracture the formation. A positive displacement pump such as a piston pump can be used to achieve these pressures though other pump styles generating sufficient rate and pressure can also be applied. An example of such a pump is the ACD Industries' 5-SLS series cryogenic pumps rated to pressures of 124 MPa (18,000 psi) with LNG rates to 0.5 m3/min (132 gpm). Single or multiple high pressure LNG pumps (235) may be applied to meet the fracturing feed rate requirement. Power needed to drive the pumps (233) and (235) can be obtained from an internal combustion engine through direct drive, generated electricity, or hydraulics as desired.

Pressured LNG exiting from the high pressure LNG pumps (235) is directed to a heater assembly (231) using conduit (236) to heat the natural gas to the application temperature, which in this specific embodiment changes the phase of the natural gas from liquid to gas. Generally, the minimum temperature to heat LNG is approximately −77° C. (−107° F.) and this temperature is where many carbon steels transform from austenite to martensite crystals with a corresponding change in metallurgy. In one embodiment, a natural gas outlet temperature to conduits (24) and (232) is in the range of 0° C. (32° F.) to 20° C. (68° F.) to avoid contacted liquid freezing issues and to maintain elasticity of seals. Within the heater assembly (231) is a heat exchanging system as needed to transfer heat to the LNG, and in this embodiment comprises a first heat exchanger (237), a second heat exchanger (239) downstream of the first heat exchanger, and a natural gas supply conduit (238) which extends from the supply conduit 236 and through the two heat exchangers 237, 239, and which couples to supply conduit 24 as well as return valve (V11). Return valve (V11) in turn is coupled to return conduit (232).

In this embodiment, the LNG is first heated by heat source (240) which is proposed as heat derived from air, typically driven across the heat exchanger coils within the first heat exchanger (237) by a blower (not shown). LNG at a temperature approaching −162° C. (−260° F.) can derive significant energy from air resulting in a lightened heating load. The discharge from the first heat exchanger (237) is then directed to the heat exchanger coils within the second heat exchanger (239) through the supply conduit (238). Within the second heat exchanger (239), the LNG is heated to the target outlet temperature by another heat source (241). The energy available from this other heat source (241) must be significant in order to support rapid heating of the LNG. The heat source (241) can be generated without flame and may be waste or generated heat from an internal combustion engine, a catalytic burner or an electric element. Alternatively heat can be generated using a flame based heat source local to the heater or remote to the process as dictated by safety requirements. Outlet of the pressurized gaseous natural gas is via supply conduit (24) with gas control valve (V6) to the natural gas slurry stream mixer (18).

Figure 5:
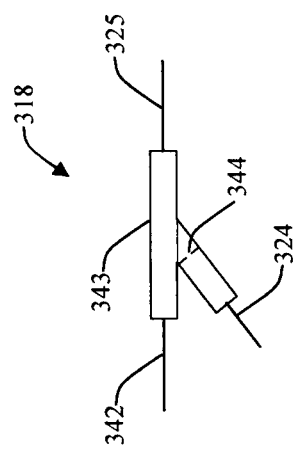
FIG. 5 is a schematic illustrating a natural gas and fracturing slurry stream mixer for at least some of the embodiments.

Once the natural gas has been sufficiently heated (which in this specific embodiment means vaporized into a gaseous state), it flows through supply conduit (24) and is mixed with the base fluid in the fracturing fluid mixer (18). The fluid pressures handled in the mixer (18) may be significant, fluid abrasion may be a significant factor and leaks are to be avoided. With respect to throughput, effective component mixing is important. While various types of mixers may be useful, one suitable mixer (318) for a compressed natural gas and fracturing slurry stream is shown in FIG. 5. The natural gas slurry stream mixer (318) works to combine and mix a base fluid stream from conduit (342) with the gaseous natural gas stream from supply conduit (324) within a mixer body (343). Achieving a good mix of the fracturing liquid stream, proppant and the gaseous natural gas stream, can contribute to creating the desired structure and behavior of the fracturing fluid mixture for an energized fluid, foam or a mist. For example, proper foam development requires the gas phase to be completely dispersed within the liquid phase with bubble sizes as small as possible. Sufficient dispersion can be achieved in a number of ways, one of which is represented by a choke device (344) in the natural gas stream conduit which by virtue of decreasing the flow area increases the velocity of the natural gas stream. Contact of the natural gas stream with the fracturing liquid stream at a high velocity promotes good mixing. Other mechanisms can be employed to promote mixing including internal diverters, turbulizers and various static or dynamic mixing devices. To safely managing a fracturing stream containing natural gas, it should be recognized that slurries containing gases can have very high velocities that can quickly erode pressure containing components.

Combining a base fluid slurry stream with a natural gas stream and then further transporting the resultant mixture through conduits and wellbores is done with the recognition that particle (proppant) impact on flow path changes can quickly result in component failure and hazardous release of the flammable gas. As such, a mixer (18) is provided that allows the base fluid containing liquid/proppant to pass in a substantially straight path through the mixer. For example, the base fluid conduit (342) may define a substantially linear inner diameter and conduit (324) may join conduit (342) at an angle. In one embodiment, for example, the mixer (18) includes a main flow line including an inlet end and an outlet end, an elbow conduit connected to and in fluid communication with the main flow line between the inlet end and the outlet end, the elbow conduit extending at an acute angle from the inlet end and a substantially linear flow path through the main flow line, the inlet end connected to receive flow from the fracturing base fluid source and the elbow conduit connected to receive flow from the natural gas source. Upon leaving the mixing body (343) the fracturing fluid mixture is then directed via a conduit (325) to the wellhead and down the wellbore to create the hydraulic fracture in the subterranean reservoir.

Figure 11:
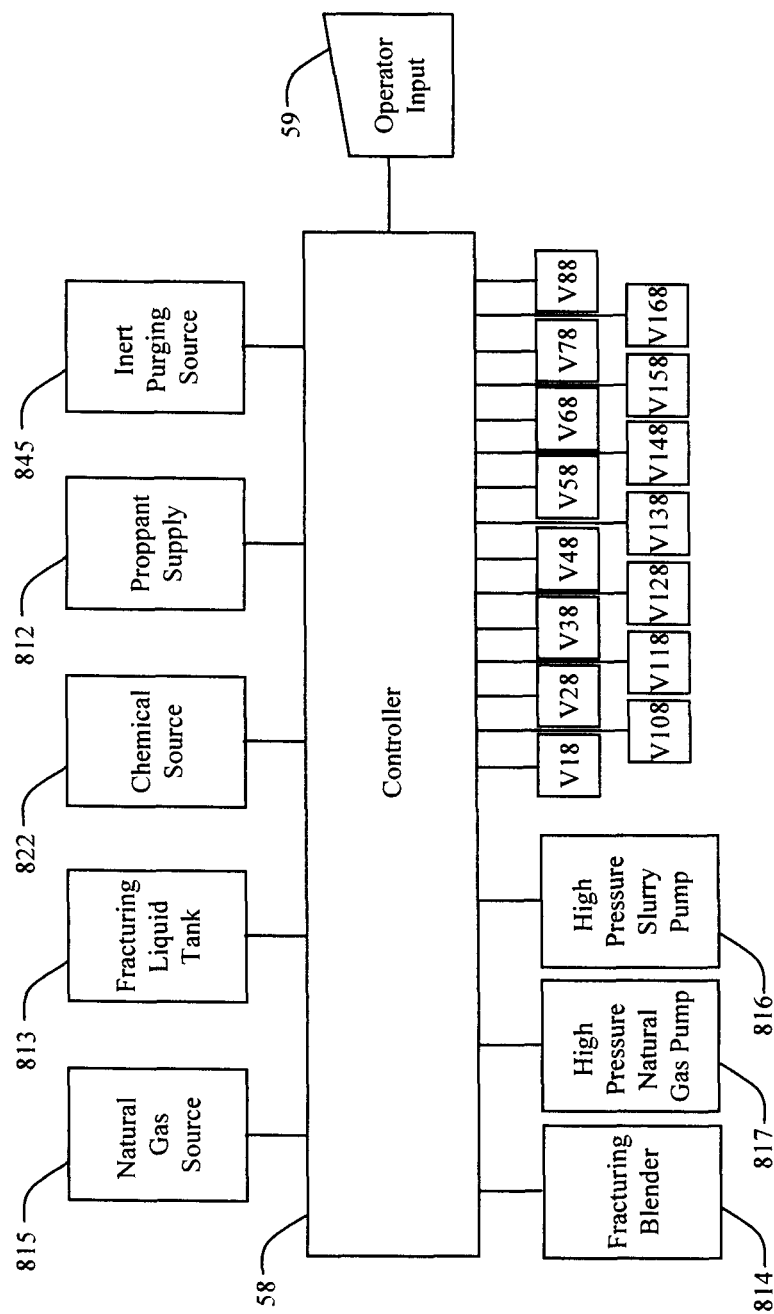
FIG. 11 is a schematic illustrating a controller for controlling the fracturing system of some of the embodiments.

Referring to FIG. 11, the fracturing system can be controlled remotely by a controller (58); the configuration and operation of the controller (58) is described further in the sixth embodiment below. In this second embodiment, control functions from controller (58) are completed through wireless communication to the controlled components as presented in FIG. 11. Application may involve control through wires or by a combination of wire based and wireless communications. In this embodiment the controller (58) is presumed a computerized control station mounted within a cabin on a truck chassis. The system can be manipulated to permit pumping of only natural gas or liquid, only liquid-slurry or any desired combination of natural gas, liquid and liquid-slurry. In some applications only natural gas will be pumped for a portion of the treatment, such as with a pre-pad or treatment flush. Alternatively, only liquid or liquid-slurry will be pumped, again with the liquid as a pre-pad, pad or flush and only liquid-slurry as a stage within the treatment. Following the treatment, the equipment is shut down, the wellhead valve (V7) closed and preparations are made for rigging off the site or for completion of another fracturing treatment. The LNG storage vessels are secured with closing of valves (V4) and opening of valve (V18). Valve (V5) is closed and valve (V8) is opened to allow high pressure natural gas to vent from natural gas treating line (24), treating line (25) and LNG fracturing pumpers (229). When the high pressure system has been vented to a nominal pressure, the LNG fracturing pumpers (229) are operated at low capacity to remove LNG from the low pressure conduit (23) into the pumps and through the heaters with discharge through treating line conduits (24), (25) through valve (V8) and to the flare system, separator (60) and flare (20). Alternatively, valve (V13) can be opened to vent the high pressure system. Valve (V8) or valve (V13) may be in the form of a choke in order to control pressure and rate into the separator and flare system. Gaseous nitrogen is simultaneously introduced to conduit (23) from inert gas source (45) via conduit (46) to assist displacement of the low pressure LNG through the LNG fracturing pumpers (229) to the flare (20). Upon displacing all natural gas liquids from the low pressure conduit (23), valve (V14) is opened to vent and completely purge the low pressure system. Correspondingly, valve (V15) is opened and gaseous nitrogen is directed through natural gas treating line (24) to complete purging of the high pressure system. In all cases, flow is directed to the flare until the natural gas content is well below the flammable limit. Natural gas content can be assessed with a hydrocarbon content gas stream monitor. With the natural gas purge of the system complete, the treating lines can be rigged from the well (19) and flow back and evaluation of the fracturing treatment initiated. Flow back is initiated by opening wellhead valve (V7) with flare line valve (V8) and (V20) opened and pipeline valve (V9) closed. Flow is directed through flare line (20a) and separator (60) to the flare (20). Separator (60) captures liquids and solids while releasing gas to the flare. Liquids are accumulated within the separator (60) and drained into storage vessels, not shown. Produced solids may include formation fines and fracturing proppant and are accumulated within the separator vessel (60) and removed as needed for continued operation of the separator. Upon achieving stable flow and sufficient gas phase pressure to allow flow into the pipeline, the flare is shut in with valve (V21) and flow directed to the sales pipeline (21) by opening valve (V9). Flow from the well (19) continues to be directed through the separator (60) with gas to the pipeline (21) until the fracturing treatment is sufficiently cleaned up and the well evaluated. The well can then be placed on production.

Figure 14:
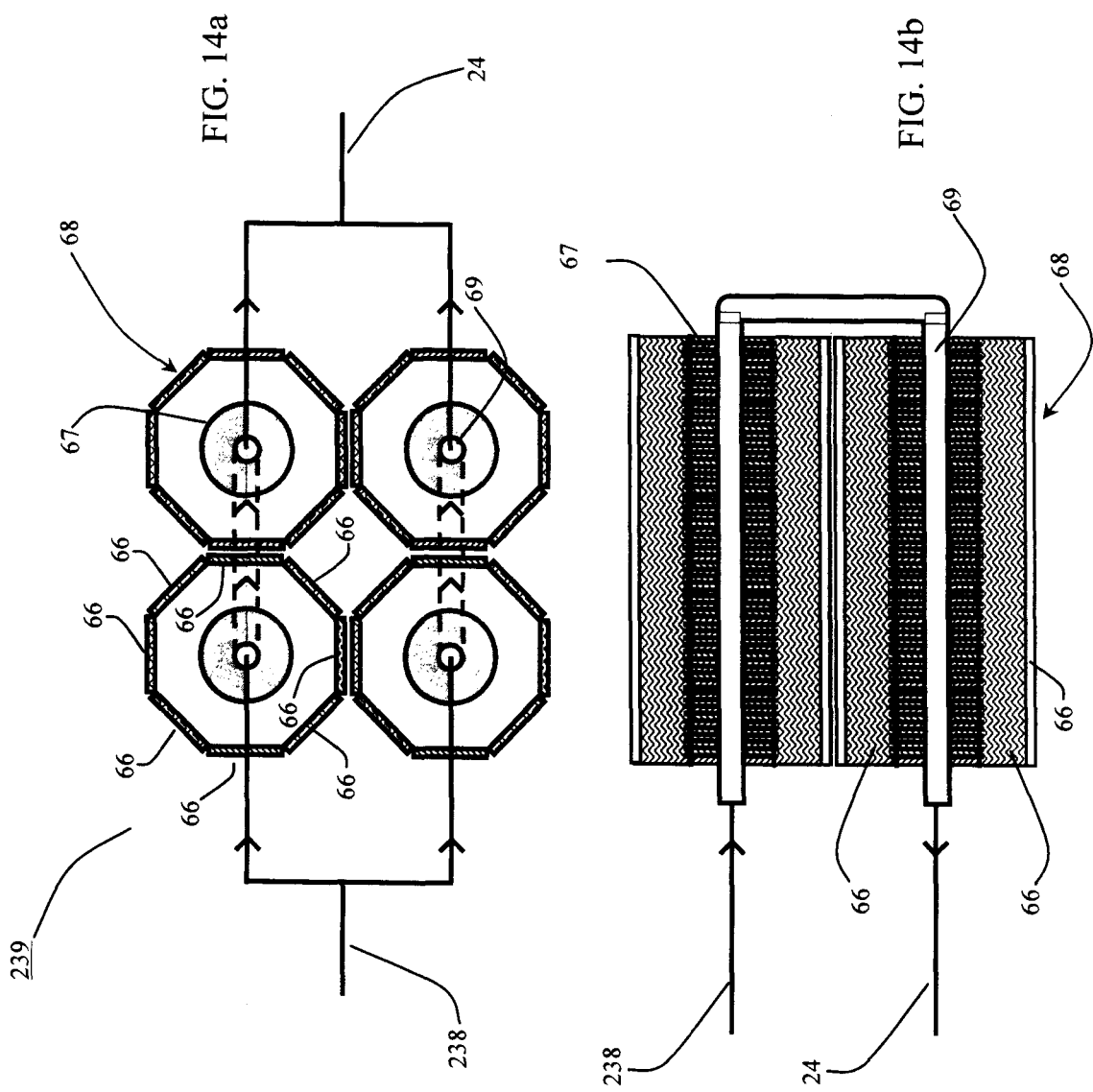
FIGS. 14(a) and (b) are schematic showing catalytic vaporizer of another embodiment of a liquefied natural gas fracturing pump assembly.

Referring to FIG. 14 an alternative apparatus for heating of LNG comprises a catalytic heater for use within the LNG fracturing pumper. The catalytic elements (66) radiate heat generated by oxidation of a fuel gas such as natural gas, propane or other suitable fuel with oxygen in the presence of a catalyst such as platinum. The fuel gas with air is injected, injection not shown, into the catalytic elements with the resultant heat being radiated to the LNG exchanger tube (67). This provides the energy needed to sufficiently heat the LNG to application temperature. In the depiction of FIG. 14, eight catalytic elements (66) are arranged concentrically in a bundle around a LNG exchanger tube (67) forming a catalytic bundle (68) for a single pass through the catalytic heating system. Each LNG exchange tube (69) flows natural gas therethrough and includes fins on an outer surface thereof to increase the surface area which heats, and serves to conduct the heat to the conduit of, the exchanger tube (69) wall for heating of the LNG. Four bundles are depicted with four groups of eight catalytic elements in each bundle heating a LNG exchanger tube (67). LNG inlet flow from the ambient pre-heater through conduit (238) is split to two of the catalytic bundles in this configuration. The schematic further shows that the LNG exiting from one catalytic bundle (68) is directed to another catalytic bundle (68) for additional heating. The configuration and arrangement of the catalytic bundles, and the flow path through the catalytic bundles, is can be varied as desired to achieve the heating target. Catalytic elements typically generate 35 Btu/hr for each square inch (15 kW/m2) of surface area such that the eight element bundle with elements of 26" (0.67 m) width and 120" (3 m) length will produce over 870,000 Btu/hr (255 kW) of energy. For the illustrated four bundle system, a generation rate approaching 3,500,000 Btu/hr (1025 kW) of energy is available. This energy level is more than sufficient to meet the heating capacity needed for a LNG fracturing pumper at 5,600 scf/min (160 sm3/min), yet is a safe and compact arrangement. As a catalytic process, the operational surface temperature of a catalytic heating element is in the range of 700° F. (370° C.) to 1,000° F. (540° C.), well below the auto-ignition temperature of natural gas in air at 1076° F. (580° C.). The catalytic heater thereby provides an intrinsically safe, flameless heat source for heating potentially flammable LNG.

Third Embodiment

Figure 6:
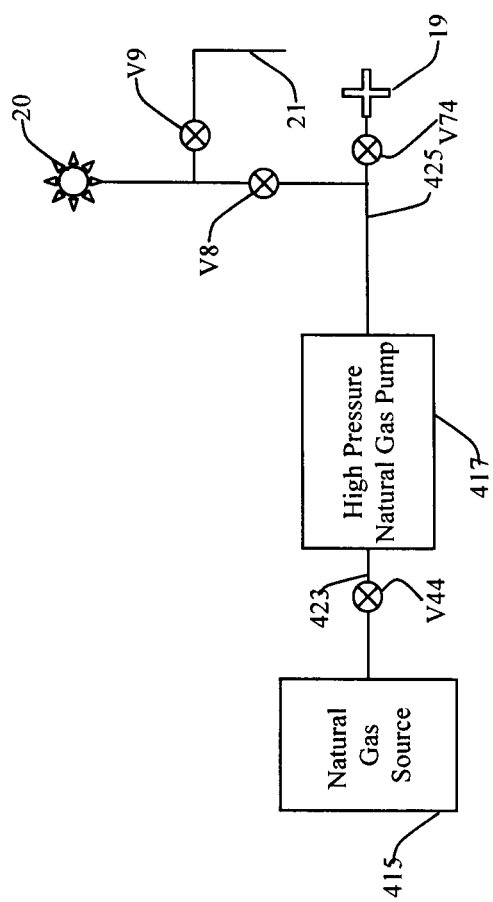
FIG. 6 is a schematic illustrating a fracturing system for injecting a fracturing fluid comprising a pure stream of natural gas into an underground formation according to a third embodiment.

Fracturing System for Injecting a Fracturing Fluid Comprising a Pure Stream of Natural Gas According to a third embodiment, and referring to FIG. 6 a fracturing apparatus is provided which uses a fracturing fluid comprising a pure stream of natural gas, wherein "pure" means without a base fluid or proppant component. Fracturing with a pure stream of natural gas can be beneficial in situations where any liquid is undesirable and proppant is not needed to maintain the created fracture system during production. This is often the case for fracturing coal bed methane wells or low pressure shale formations where liquid removal can be difficult. In this embodiment, a natural gas source (415) is one or more vessels containing either of compressed natural gas or liquefied natural gas. The natural gas source (415) is connected to a high pressure natural gas pump (417) via conduit (423) with valve (V44) for control of the natural gas feed. The high pressure natural gas pump is a compressor applying gas compression in the case of a CNG source and is a cryogenic pump and heater in the case of a LNG source. The prepared natural gas stream leaves the high pressure natural gas pump (417) via conduit (24), through valve (V74) conduit (425) and into the wellhead (19). The pure gas stream then travels down the wellbore to create the hydraulic fracture in the subterranean reservoir.

Fourth Embodiment

Figure 7:
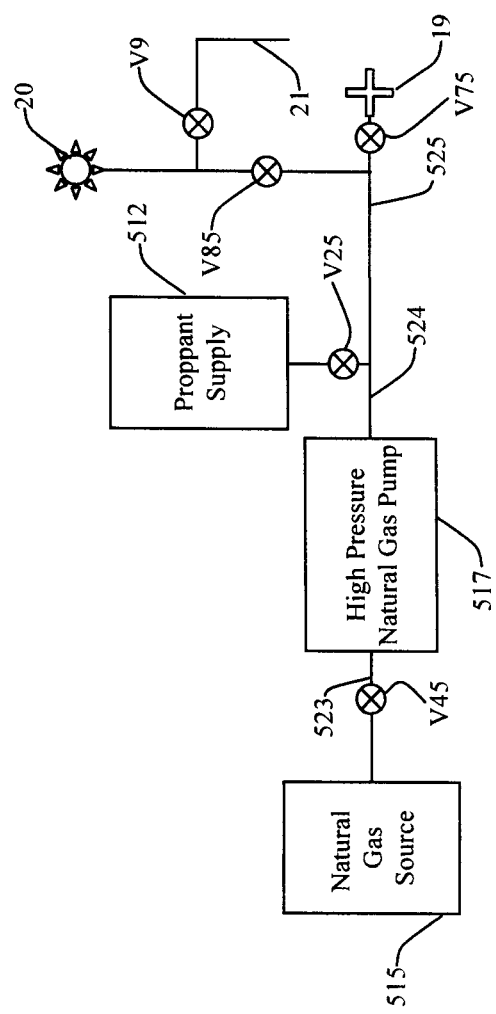
FIG. 7 is a schematic illustrating a fracturing system for injecting a fracturing fluid mixture comprising natural gas and proppant into an underground formation according to a fourth embodiment.

Fracturing System for Injecting a Fracturing Fluid Mixture Comprising Natural Gas and Proppant but No Fracturing Liquid According to a fourth embodiment and referring to FIG. 7 a fracturing apparatus and configuration is provided which uses a fracturing fluid stream of natural gas and proppant but no fracturing liquid. Fracturing with a stream of natural gas containing only proppant can be beneficial in situations where any liquid is undesirable and proppant is required to maintain the created fracture system during production. This is often the case for fracturing coal bed methane wells or low pressure shale formations where liquid removal can be difficult. In this embodiment, a natural gas source (515) is one or more vessels containing either of compressed natural gas or liquefied natural gas. The natural gas source (515) is connected to a high pressure natural gas pump (517) via conduit (523) with valve (V45) for control of the natural gas feed. The high pressure natural gas pump (517) is a compressor applying gas compression in the case of a CNG source and is a cryogenic pump and heater in the case of a LNG source. The gaseous natural gas stream leaves the high pressure natural gas pump (517) via conduit (524). A proppant supply (512) with control valve (V25) intersects the conduit (524). The proppant supply (512) is pressurized to match the discharge pressure from high pressure natural gas pump (517). Proppant flow from the supply (512) is gravity fed into conduit (524) with proppant addition controlled by valve (V25). The resulting natural gas slurry continues along conduit (524), through valve (V75) conduit (525) and into the wellhead (19). The gas stream and proppant then travels down the wellbore to create the hydraulic fracture in the subterranean reservoir.

Fifth Embodiment

Figure 8:
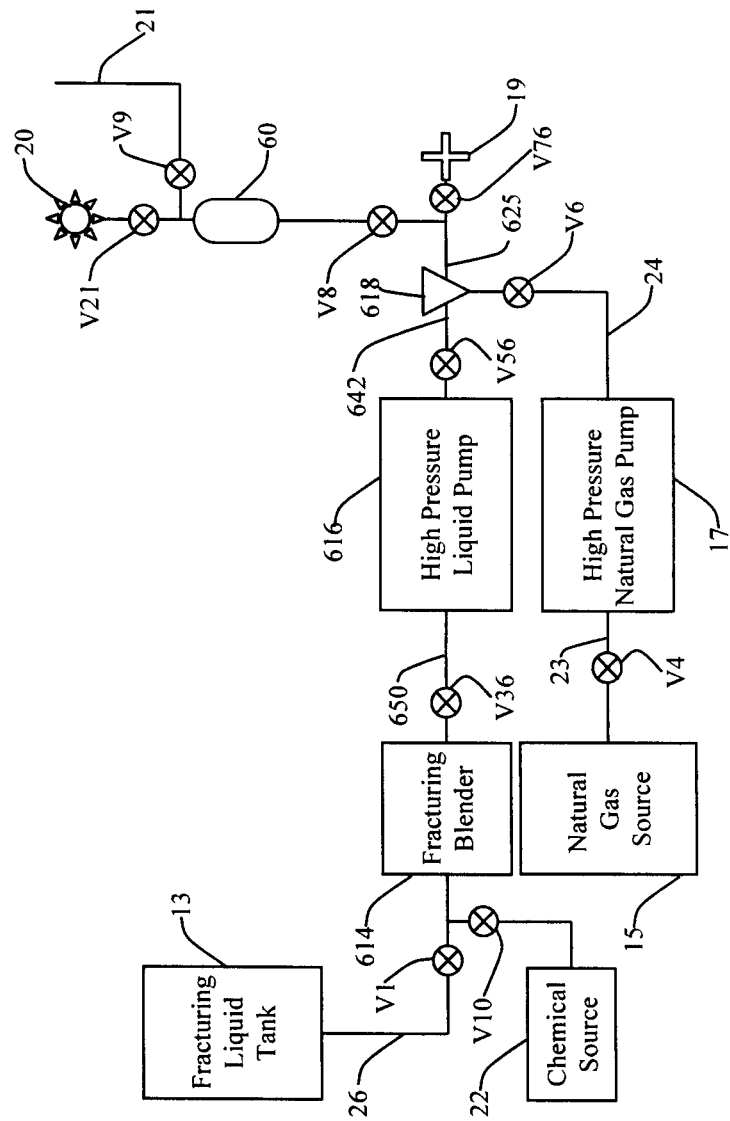
FIG. 8 is a schematic illustrating a fracturing system for injecting a fracturing fluid mixture comprising natural gas and a base fluid without proppant into an underground formation, according to a fifth embodiment.

Fracturing System for Injecting a Fracturing Fluid Mixture Comprising Natural Gas and a Base Fluid without Proppant According to a fifth embodiment and referring to FIG. 8, a fracturing apparatus is provided which uses a fracturing fluid mixture comprising natural gas and a base fluid that does not have any proppant.

Fracturing with such a fracturing fluid mixture can be beneficial in situations where a liquid portion is desired within the created fracture system and proppant is not needed to maintain the created fracture system during production. This is often the case for acid fracturing carbonate formations where natural gas energized or foamed acid is used to create and etch a fracture system. In this embodiment, the fracturing liquid tank (13) contains the desired liquid. Conduit (26) is used to transfer the liquid to a fracturing blender (614) where fracturing chemicals from chemical source (22) are also directed and mixed with the liquid. The discharge from the fracturing blender (614) passes through a conduit (650) as controlled by valve (V36) and is received by high pressure liquid pump (616). Discharge from high pressure liquid pump (616) is directed to a fracturing fluid mixer (618) along conduit (642), controllable by upstream valve (V56). The natural gas source (15) is one or more vessels containing either of compressed natural gas or liquefied natural gas. The natural gas source (15) is connected to the high pressure natural gas pump (17) via conduit (23) with valve (V4) for control of the natural gas feed. The high pressure natural gas pump is a compressor applying gas compression in the case of a CNG source and is a cryogenic pump and heater in the case of a LNG source. The gaseous natural gas stream leaves the high pressure natural gas pump (17) via conduit (24), through valve (V6) and into the natural gas stream slurry mixer (618) where it is combined with the liquid fracturing stream from conduit (42). The mixed natural gas and liquid stream leaves the mixer (618) along conduit (625) and into wellhead (19). The mixed natural gas and liquid stream then travels down the wellbore to create the hydraulic fracture in the subterranean reservoir.

Sixth Embodiment

Fracturing System Having Natural Gas Venting and Purging Equipment

According to a sixth embodiment, the natural gas fracturing system can further include equipment for venting, purging, and/or isolating natural gas ("venting, purging and isolation equipment"). Such equipment is beneficial to control the risks associated with natural gas being a flammable high pressure gas source. The equipment can include use of a cryogenic inert gas cooled to pre-cool the high pressure natural gas pump or other equipment prior to introducing the natural gas. This eliminates the need to pre-cool the system using flammable natural gas and eliminates the natural gas flaring otherwise needed. The inert gas can also be used to pressure test the fracturing system to identify any leaks or failures, or permit any configuration or function testing of the system. Also, the inert gas can be used to substitute any natural gas source to quickly purge any residual natural gas, oxygen, or air before, during or after fracturing treatment. In the event of a leakage or component failure during fracturing treatment, the venting, purging and isolation equipment allows for that component to be isolated so that the remainder of the system is unaffected.

Figure 9:
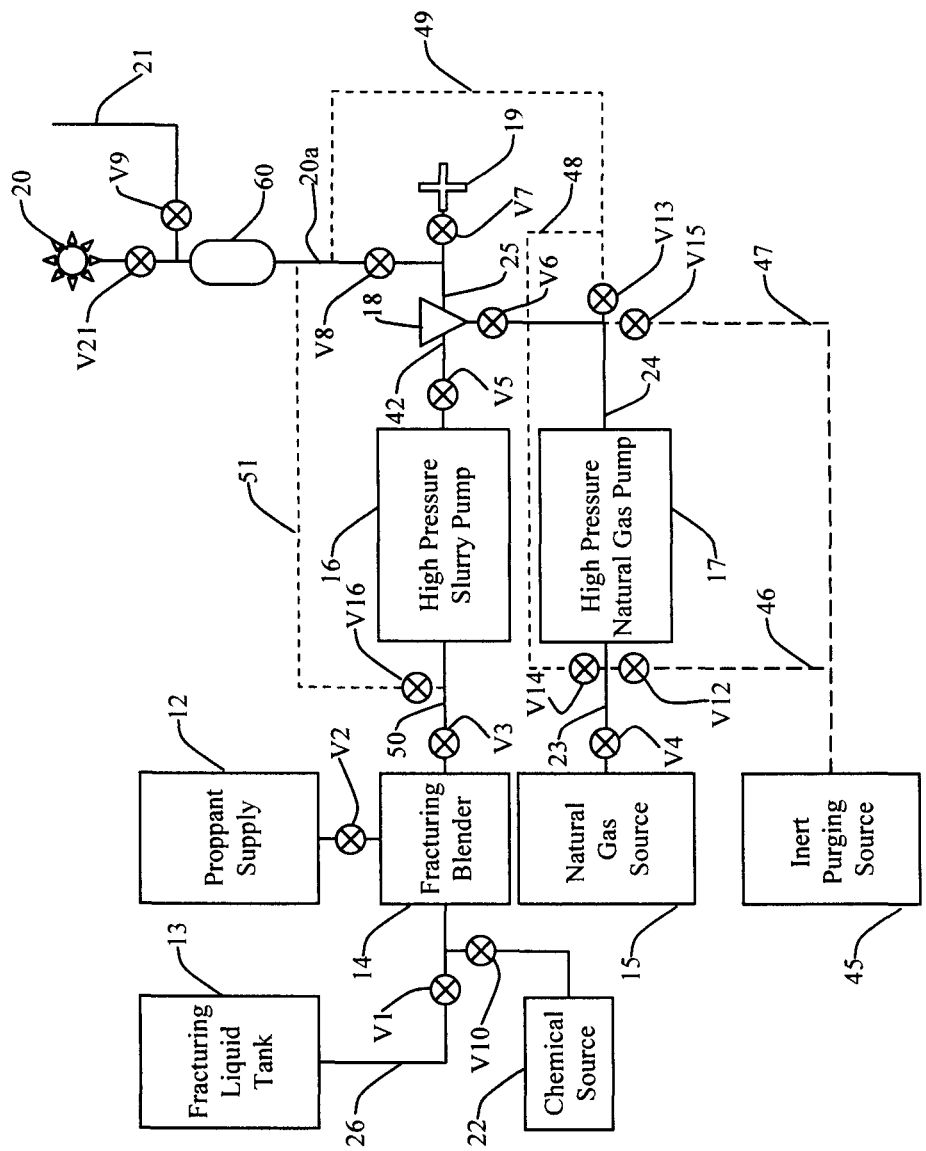
FIG. 9 is a schematic showing a fracturing system for injecting a fracturing fluid mixture into an underground formation wherein the system includes natural gas venting and purging equipment, according to a sixth embodiment.

FIG. 9 shows an embodiment of the fracturing system having the fracturing fluid storage and supply equipment as shown in FIG. 1 with the natural gas venting, purging and isolation equipment. The venting, purging and isolation equipment comprises a series of valves V12-V16 fluidly coupled to the natural gas and base fluid supply conduits 23, 24, 42, 50 in the system, an inert purging source 45 for purging components of the system (and optionally cryogenically cooling such components), a series of inert gas supply conduits 46, 47 for delivering the inert gas to the natural gas and base fluid supply conduits 23, 24, 42, 50 and venting conduits 48, 49, 51 for venting gases from the supply conduits 23, 24, 42, 50. A controller 58 (see FIG. 11) can also be provided to control the venting, purging and isolation operations.

Purging is carried out prior to introducing natural gas into the system from valve (V4) through equipment and conduits to the wellhead valve (V7), i.e. supply conduit (23), NG pump (17), conduit (24), mixer (18) and conduit (25). In the present system, venting followed by purging is carried out on all natural gas containing conduits and equipment following the fracturing treatment and prior to rigging out the equipment for mobilization. The venting and purging can potentially encompasses the system from valve (V5) and as far upstream as valve (V3,) (wherein venting is accomplished via valve (V16) through conduit (51) to flare (20)) to address overpressure reverse migration, and from natural gas source outlet valve (V4) through equipment and conduits to wellhead valve (V7).

Additionally, and in the case of an unplanned natural gas release due to component failure, the failed component may be internally isolated and the natural gas remaining in the isolated system components vented and purged. For purging and venting a low pressure portion of the natural gas system, the inert purging source (45) is connected via inert gas supply conduit (46) and inert gas supply valve (V12) to the natural gas supply conduit (23) after the natural gas source outlet valve (V4) and before the high pressure pump (17). This arrangement enables inert gas to be delivered to the low pressure section of the natural gas supply conduit 23. Further, venting conduit (48) with venting conduit (49) are attached to natural gas supply conduit (23) through venting valve (V14) which is located downstream of the natural gas source outlet valve (V4) and upstream the high pressure pump (17); this venting conduit (48) is coupled to venting conduit (49) which in turn is coupled to flare conduit (20a). This arrangement enables the inert gas and natural gas to be vented from the natural gas supply conduit (23) and through flare (20).

For purging and venting a high pressure portion of the natural gas system, the inert purging source (45) is connected to a high pressure section of the natural gas supply conduit (24) (which is located downstream of the high pressure natural gas pump (17)) via inert gas supply conduit (47) and inert gas supply valve (V15). Additionally, venting conduit (49) with flare line conduit (20a) is attached to the natural gas supply conduit (24) downstream of the high pressure natural gas pump (17) through venting valve (V13). This arrangement enables the inert gas to purge the natural gas supply conduit (24) and for gases to vent from this conduit (24) through flare (20).

For purging and venting a high pressure fracturing fluid portion of the system and the well, flare line conduit (20a), through valve (V8) is connected to fracturing fluid supply conduit (25) upstream valve (V7), and downstream mixer (18), base fluid supply conduit (42) and isolation valves (V5) and (V6). This arrangement enables purging of conduit (25) by purging fluid from source (45) via conduit (47), through open valve (V15), through mixer (18) and into conduit (25); valve (V13), (V5), (V7) are closed. Also, this arrangement enables fluids in fracturing fluid supply conduit (25) to vent through the flare 20 via valve V8 and flare line conduit 20a.

Also, base fluid supply conduit (50) is coupled to flare (20) via venting valve (V16) and venting conduit (51); this arrangement enables fluids to be vented from the base fluid conduit to the flare 20, e.g. in the event an internal leak occurs and natural gas enters the base fluid storage and supply portion of the system.

The venting and purging equipment permits isolation, venting and purging of the system as needed to make it safe under all reasonable conditions. As an example, should fracturing fluid mixer (18) experience an unplanned release, the isolation valves (V5), (V6) and (V7) can be immediately closed to isolate the release from other parts of the system. The source valves (V3) and (V4) are then closed and the valve (V8) is opened to direct all and any gas within the isolated portion of the failed system to the flare (20) and thereby control and eliminate the release from the natural gas stream slurry mixer (18). As another example, valve (V14) can be opened to vent contents enclosed within conduits and equipment between valves (V4) and the high pressure natural gas pump (17) through vent conduits (48), (49) and flare line conduit (20a). Similarly, valve (13) can be opened to permit venting of contents enclosed within conduits and equipment between the high pressure natural gas pump (17) and valve (V6) through vent conduits (49) and flare line conduit (20a).

Upon sufficient venting, purging can be initiated by opening valves (V12) and (V15) and directing purging fluid from inert purging source (45) through the inert gas supply conduits (46) and (47). Purge flow can be directed as required through various paths in natural gas and fracturing fluid conduits (23), (24), (25) and venting conduits (48) and (49) to the flare line conduit (20a) by manipulating valves (V12), (V15), (V13), (V14), (V6), (V5), (V8) and (V16), as needed, to vent and purge the complete system.

The inert purging source (45) is comprised of storage for an inert fluid suitable for purging with a device suitable to move the purging fluid through the system. The purging fluid, in one embodiment, is an inert gas such as carbon dioxide or nitrogen and can be stored either as a cryogenic liquid or in a pressurized gas phase. It is possible to complete purging with the inert fluid in gaseous phase, but in some cases and/or in later processes such as system cooling, the inert fluid may be employed in liquid phase. Dependent upon the choice of inert fluid and its phase, moving the purging fluid through the system will be accomplished by any of a control valve, pump or pump and heater, which in one embodiment are not shown and contained within inert purging source (45), and which in another embodiment can be existing equipment The aforementioned configuration of venting and purging equipment and method for venting and purging using such equipment relates specifically to the fracturing system described in FIG. 1. However, such venting and purging equipment can be readily adapted for other fracturing systems such as those shown in FIGS. 2, 3, 6, 7 and 8. When using LNG as the source of natural gas as illustrated in the FIG. 3 embodiment, the inert purging source (45) may be liquid nitrogen and the natural gas fracturing pump (229) is cooled to cryogenic temperatures, purged and pressure tested using nitrogen. In such an embodiment, the hazards encountered with completing these steps using LNG can be reduced or eliminated altogether. The liquid nitrogen is withdrawn from source (45) through line (46) to the natural gas fracturing pump (229). The natural gas fracturing pump's cryogenic internal components are flooded with the liquid nitrogen which vaporizes upon contact with the warm components. The created vapor is vented to atmosphere through flare line conduit (20) until the internals are sufficiently cooled such that the liquid nitrogen no longer vaporizes.

Referring to FIG. 11, operation of the fracturing system including the purging and venting equipment is controlled by a controller (58). This controller (58) has a memory programmed to control the operation of at least some components within the system. The controller (58) may communicate with components in the system by direct connection or wireless connection to the various components. For example, fracturing blender (814), high pressure natural gas pump (817) and high pressure slurry pump (816) may be remotely controlled. The valves (V1) through (V16) may also be remotely controlled. Remote control capability permits ready and reliable control of the operation from a central point plus allows control of the system during normal operations, and in particular an emergency, without exposing personnel to hazards. Control of the components is directed by either the operator of the system via a user interface (59) or through software containing algorithms stored on the memory of the controller and developed to direct the components to complete the task in a suitable manner. The controller is any suitable process control system and may include control inputs from operator panels or a computer. Similar control capability is applicable to other described configurations and other components as required.

For example, the controller (58) is connected to and controls the operation of the feed valve (V4) and the high pressure natural gas pump (817) thereby controlling the supply of pressurized natural gas from its source (815) to the natural gas stream slurry mixer (18). Concurrently, controller (58) is connected to and controls the operation of the fracturing liquid control valve (V1) to regulate flow from the fracturing liquid tank (813), the proppant supply valve (V2) to regulate flow from proppant supply (812), the chemical source (822) and the fracturing blender (814) in order to supply a properly constructed liquid slurry to the high pressure slurry pump (816). Simultaneous control functions continue with controller (58) connected to and controlling high pressure slurry pump (816). Controller (58) further ensures a properly proportioned mixed natural gas and liquid slurry stream is created by controlling the relative supply of the natural gas fracturing stream compared to the liquid slurry stream by control of the high pressure slurry pump (816) and the high pressure natural gas pump (814).

The controller (58) is also connected to valves (V3), (V5), (V6), (V7), (V8), (V10), (V11), (V12), (V13), (V14), (V15) and (V16) and inert purging source (845) to control the venting, purging an isolation operations and to monitor the condition of system components. In this regard, the controller memory can have stored on it instructions to carry out the venting, purging and isolation protocols as described above.

Method Of Operation

Figure 15:
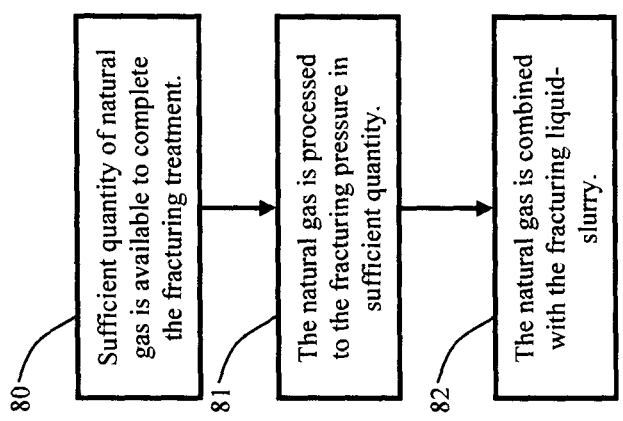
FIG. 15 is a process flow diagram illustrating a method for fracturing an underground formation with a fracturing fluid mixture using a fracturing system according to at least some of the embodiments.

FIG. 15 is a flow schematic illustrating a method of forming a fracturing fluid mixture that contains natural gas as a gas phase in sufficient quantity to desirably alter the characteristics of the fracturing treatment.

At step (80), a sufficient quantity of natural gas is made available to complete the fracturing treatment. Fracturing treatments can consume considerable quantities of fracturing fluids with common volumes over 500 m$^3$ (130,000 gal) with unconventional fracturing consuming volumes in the order of 4,000 m$^3$ (1,000,000 gal). Applying any reasonable quantity of natural gas to the fracturing treatment can consume anywhere from 50,000 sm$^3$ (1.5 MMscf) to 300,000 sm$^3$ (10 MMscf) of gas within a 4 to 6 hour pumping period. To meet the volume and rate requirement, the natural gas is stored awaiting pumping for most applications. Storage of natural gas can be completed by either holding it in pressured vessels or by liquefying for storage in cryogenic vessels. Efficient storage of natural gas in pressured vessels is achieved at the highest possible pressure which is typically less than 30 MPa (4,400 psi), holding approximately 10,000 sm$^3$ (0.4 MMscf) in each unit. Effective storage of these quantities even at maximum pressures would require several pressurized vessels with numerous connections between tanks and pumping equipment at the elevated storage pressures. Alternatively, LNG can be stored in LNG tanks on-site which permits considerable volumes to be stored efficiently and at pressures as low as atmospheric. As a cryogenic liquid one unit volume of LNG contains approximately six hundred volumes of gas at atmospheric conditions. In a single LNG storage vessel containing 60 m$^3$ (16,000 gal) of LNG, an equivalent of 36,000 sm$^3$ (1.2 MMscf) is stored. A large treatment would require approximately 10 LNG storage tanks compared to over 30 pressured natural gas tanks. The use of LNG eliminates the issues found with gas phase storage; the multitude of high pressure vessels and piping needed to draw the natural gas from the pressure vessels result in a very complex and potentially hazardous system.

Step (81) of FIG. 15 refers to processing the natural gas to the fracturing pressure in sufficient quantity. Fracturing pressures are often in the range of 35 MPa (5,000 psi) to 70 MPa (10,000 psi), while the natural gas rate is usually from 400 sm$^3$/min (15,000 scf/min) to 1,200 sm$^3$/min (40,000 scf/min). Pressuring the compressed natural gas to fracturing pressures requires gas phase compressors of some form. Alternatively, pressuring natural gas to the extreme pressures encountered in hydraulic fracturing in liquid form as LNG is exceptionally efficient. As a liquid the volumetric rates are much reduced and incompressible as compared to gaseous natural gas, compression heating is eliminated and equipment size and numbers drastically reduced. The cryogenic natural gas liquid is directly pressured to the fracturing pressure by a single pump, and then simply heated to the application temperature. For an upper-end fracturing gas rate at pressure, LNG is pumped at approximately 2 m$^3$/min (500 gal/min) of liquid yielding a gas rate in excess of 1,500,000 sm$^3$/day (60 MMscf/day) through 8 units of rate to 160 sm$^3$/min each. This smaller and simpler equipment configuration significantly reduces the complexity of the operation removing many of the costs and hazards which would be present with compressed gas techniques.

At step (82), the natural gas stream is combined with the base fluid stream. As disclosed previously, the mixer (18) can be used to combine the two streams in a high pressure treating line prior to or at the wellhead; this approach allows easy handling of the separate streams without disruption to typical fracturing operations, completes the task without modification to the well and is a simple and effective way to accomplish mixing the natural gas and liquid-slurry streams. This results in a simple, effective and reliable method for mixing these components.

Alternatively, the base fluid stream can be combined with the natural gas stream in a low-pressure process or within the wellbore at fracturing pressure. The natural gas is injected down one conduit within the wellbore and the liquid-slurry down another with the two streams combining at some point in the wellbore. In these cases, some type of a specialized wellhead or wellbore configuration in the form of an additional tubular and a common space is provided where the two streams can meet.

In one embodiment, step 80 includes providing a supply of liquefied natural gas stored in cryogenic vessels, step 81 includes employing a cryogenic pump to process the liquefied natural gas to fracturing pressure and supply it at a suitable rate and employing a heat exchanger to heat the liquid natural gas to the application temperature, and step 82 includes combining the natural gas with a base fluid with mixer (18) to obtain a resultant fracturing fluid prior to passing the resultant fracturing fluid to the wellhead.

EXAMPLES

The following examples are provided for illustration only and are not intended to limit the scope of the disclosure or claims.

Example 1

Figure 12:
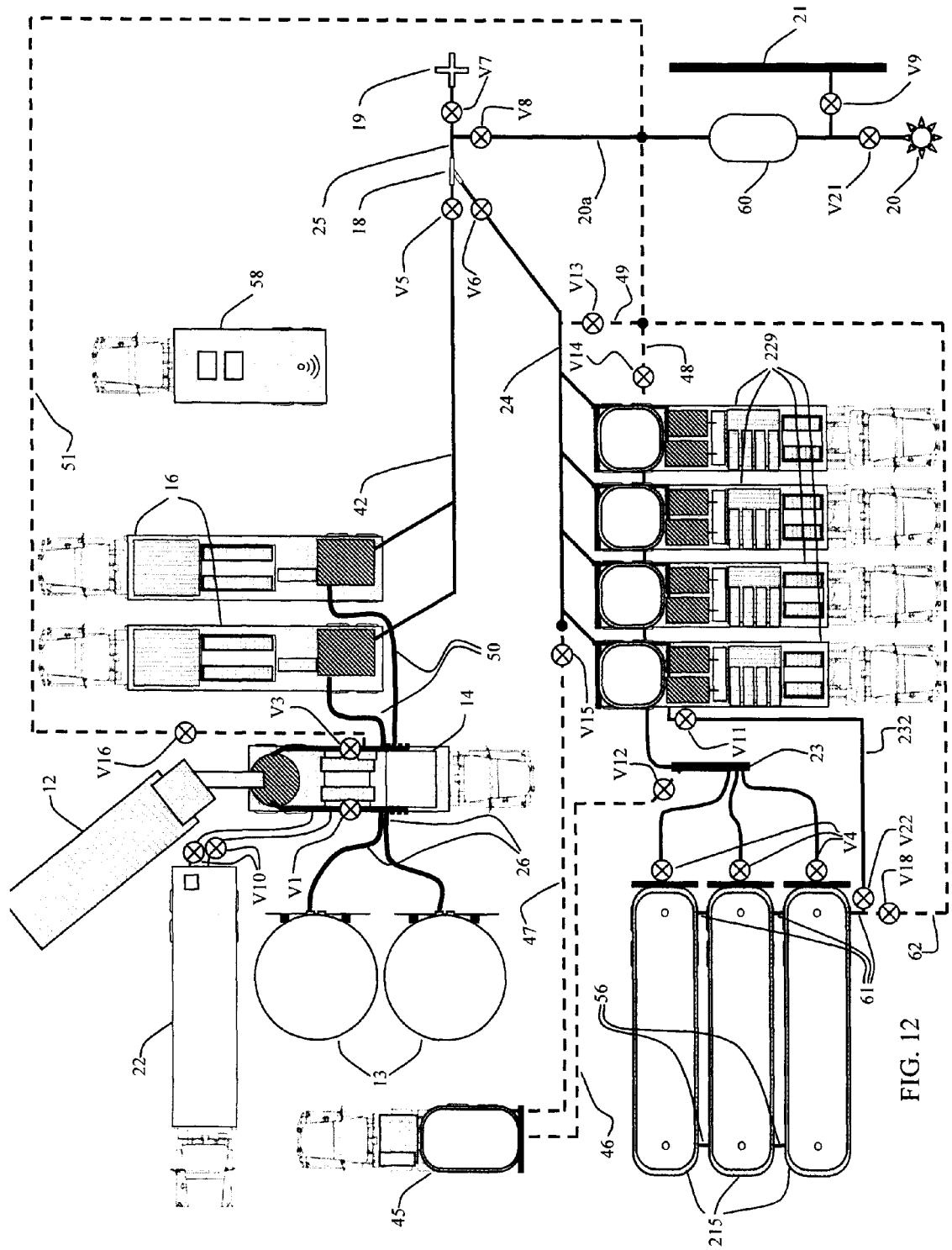
FIG. 12 is a schematic showing an exemplary surface equipment layout of at least some embodiments of the fracturing system.

FIG. 12 is a schematic of an embodiment showing a configuration where the natural gas fracturing system components mounted on a series of mobile trucks. The mobile trucks transport the equipment for creating and pressurizing the liquid based fracturing slurry; the fracturing blender (14), the chemical source (22), the high pressure pump (16), plus transport the equipment for storing, pressurizing and heating the liquefied natural gas; the LNG storage tanks (215) and LNG fracturing pumps (229) and the ancillary equipment; the inert purging source (45) and the controller (58).

The configuration and apparatus on any one unit can be altered or the equipment may be temporarily or permanently mounted as desired. This embodiment displays multiple LNG storage tanks (215) connected to multiple LNG fracturing pumps (229). Pre-treatment pressure testing of the liquid and proppant pumping system, components (14), (16), (22) and conduits (26), (50), (42), (25) is completed with the fracturing liquid (13) or other suitable liquid as desired. Liquid supply (13), proppant addition (12), chemical addition (22), proppant blending (14) and liquid slurry pressurization (16) are completed with the equipment components as shown and delivered to liquid-slurry conduit treating line (42). The LNG storage tanks are connected to conduit (62) to allow venting to the flare (20) through flare line (20a) until beginning the treatment when valve (V18) is closed. Conduit (46) connects the inert gas source (45) to the inlet conduit (23) for supply of cryogenic nitrogen to the LNG fracturing pumps for cryogenic cool down, pre-treatment purging and pressure testing of the LNG supply plumbing (23), pumping and heating equipment (229) and the natural gas conduit treating line (24). Inert gas source (45) is also connected to natural gas treating line conduit (24) to permit venting or purging with gaseous nitrogen of the high pressure system if required.

Purged or vented natural gas can be directed to the separator (60) and to flare (20) via either vent conduit (49) with valve (V13) or conduit (20a) with valve (V8). Similarly, the low pressure conduit (23) can be purged with gaseous nitrogen or vented through conduit (46) via vent conduit (48) to separator (60) and onward to flare (20) via valve (V14). Cool down and purging are completed with cryogenic nitrogen directed through conduits (46) and (23) to the inlet of the LNG fracturing pumps (229). In turn, each of the LNG fracturing pumps (229) is flooded with the liquid nitrogen until sufficiently cooled to accept LNG without vaporization. Vaporized nitrogen is released from the LNG fracturing pumps (229) through natural gas treating line conduit (24), value (V6), flare conduit (20a) to flare (20). Upon establishing cool down in each LNG fracturing pump (229), the flare valve (V8) is closed and nitrogen pumped and heated by the LNG fracturing units to achieve a high-pressure pressure test of the system with nitrogen. The base fluid supply system is isolated throughout this process by closed valve (V5). Upon completing the pressure test of the natural gas pumping system, valve (V8) is opened, pressure is released, the nitrogen source is isolated with valve (V12), and the LNG source valves (V4) are opened to permit flow of LNG into the system. The LNG fracturing pumps (229) are operated to displace nitrogen from the system with LNG in preparation to begin the fracture treatment. Discharge from the LNG fracturing pumps is directed through treating line conduit (24) to flare line (20a) until natural gas is observed at the flare. Valve (V8) is then closed, valves (V5), (V6) and (V7) opened and the fracturing treatment started. LNG is drawn from tanks (215) through conduit (23), into LNG fracturing pumps (229) for pressurization and heating with discharge through natural gas conduit treating line (24). The liquid-slurry base fluid stream from conduit (42) mixes with the gaseous natural gas stream from conduit (24) within fracturing fluid mixer (18) and is directed to the well (19) through treating line conduit (25).

Example 2

Using apparatus such as that of FIG. 3, FIG. 9 and FIG. 11, an example, proposed application of the system is given to illustrate the method. The objective is to stimulate a gas bearing reservoir at a depth of 2500 m with a 100 tonnes of proppant using a 75% quality slick water foamed natural gas fracturing treatment. The well has perforations at a depth of 2500 m with 114.3 mm casing, no tubing and a bottom hole temperature of 90° C. In this example, the natural gas source is selected as liquefied natural gas (LNG) and the relevant apparatus and configuration of FIG. 3. is applied.

TABLE 1

Natural Gas Frac 100 tonne Natural Gas Foamed Slick Water Frac

| Fluid: | 75% Quality Foamed Slick Water with Natural Gas | |
|---|---|---|
| Proppant: | 10 tonne | 50/140 mesh sand |
| | 90 tonne | 30/50 mesh sand |
| Treating Rate: | 5.0 m3/min | |

Injection Calculations

| | |
|---|---|
| Depth to Top Perforation: | 2.510.5 m |
| Frac Gradient: | 18.0 kPa/m |
| Bottom Hole Fracturing Pressure | 45.189 kPa |
| Surface Injection Pressure (1) | 56.267 kPa |
| Bottom Hole Temperature | 90 deg C. |
| Water Density | 1.000 kg/m3 |
| Blender Rate | 1.3 m3/min |
| Required Liquid Pump Power | 1.172 kW |
| Natural Gas Specific Gravity (2) | 212.3 kg/m3 |
| Natural Gas Volume Factor (2) | 312.0 m3/sm3 |
| Natural Gas Rate | 1170 sm3/min |
| Required LNG Fracturing Pumps | 7 units @ 160 sm3/min each |

Wellbore Volume to Top Perforation

| | Interval | ID | Capacity | Volume |
|---|---|---|---|---|
| Tubing | 0.0 m | 0.0 mm | 0.00000 m3/m | 0.0 m3 |
| Casing | 2510.5 m | 95.0 mm | 0.007088 m3/m | 17.8 m3 |
| Total | 2510.5 m | | | 17.8 m3 |
| Underflush | | | | 0.5 m3 |
| Flush Volume | (DO NOT OVERRFLUSH) | | | 17.3 m3 |

(1) Calculated for the compresible foam column at rate with based fluid rheology for slick water
(2) At bottom hole fracturing pressure Equipment is mobilized to the well site and spotted. For this treatment, specific equipment include one of a high pressure pumper (16) at capability to 1,127 kW, seven of 160 sm3/min LNG fracturing pumps (229) to a rate of 1,170 sm3/min, two of 64 m3 liquid tanks (13) and three of 60 m3 LNG tanks (215). An inert purging source is supplied with liquid nitrogen. Chemical source (22) is provided to apply two additives. A pre-rigging safety meeting is conducted detailing site hazards, location of safety equipment, safety areas, and the site evacuation plan. The equipment is rigged in following the configuration specified in FIG. 9 and FIG. 11 including the adaptation presented in FIG. 3 for a LNG source fracture treatment. The liquid tanks (13) are loaded with 119 m3 of water and 168 m3 of LNG is provided in the LNG storage tanks (215). The proppant supply vessel (12) is loaded with 10 tonnes of 50/140 mesh sand and 90 tonnes of 30/50 mesh sand. The chemical source (22) is loaded with a friction reducer to 107 L volume and a foaming surfactant to 308 L volume.

A pressure test is then conducted on the system. Typical to an anticipated injection pressure approaching 57,000 kPa, the pressure test of the high pressure components is completed to a pressure of 69,000 kPa. Valve manipulation and operation of the apparatus in completed under the control of controller (58). Pressure testing for the liquid portion of the system, from fracturing liquid tanks outlet valve (V1) to the wellhead control treating valve (V7), is completed with water from the fracturing liquid tanks (13). To initiate the pressure test valves (V1), (V3), (V6), (V7), (V8), (V10) and (V16) are closed. Valve (V1) is then opened to release water to the fracturing blender (14). The fracturing blender is operated to circulate water at operating pressure, typically less than 700 kPa (100 psi) and confirmed free of leaks. Valve (V3) is then opened to feed water to the high pressure slurry pump (16). A bleed port (not shown) in the treating line (42), before valve (V5) is opened to permit flow through the high pressure pump. The high pressure pump (16) is slowly rotated to capture water feed and when a full water stream escapes from the bleed port, the pump is fully primed and the port is closed. All personnel clear the area and additional power is applied to the high pressure pump (16) to pressure the pump itself plus the conduit (42) and (25) treating lines, the valves (V5), (V6), (V7) and (V18) and the natural gas stream slurry mixer (18) to the required test pressure of 69,000 kPa. When at test pressure, the high pressure slurry pump (16) is then stopped and the tested components checked for compliance. Pressure is then released from the liquid line and the liquid system test is complete.

Preparation and testing of the natural gas system is then begun. Pressure testing is completed on all components from valve (V42) through valve (V6) including conduit (32) vapor feed line to the LNG source (215) and nitrogen will be used to pressure test, purge and cool down the natural gas conveying system. To initiate the pressure test, valves (V4), (V6), (V11), (V12), (V13), (V14) and (V15) are closed. Valve (V12) is then opened and the inert purging source is operated to pump and vaporize nitrogen into the system to a pressure of 2 MPa (300 psi) to complete a low-pressure pressure test. Operation of the inert purging source is then stopped and conduit (23), valves (V4), (V6), (V12), (V13), (V14) and (V15) are checked for leaks. Upon confirmation that there are no leaks, pressure is bled from the system through to flare (V20) through conduit vent line (48) by opening valve (V14). Valve (V14) is then closed and LNG source (15) is operated to release liquid nitrogen to the LNG fracturing pumper (229) through conduit (46) into conduit (23). The LNG fracturing pump (229) is operated and cryogenic internal components are flooded with the liquid nitrogen which vaporizes upon contact with the warm components. The created nitrogen vapor is vented to atmosphere through flare line conduit (20) until the internals are sufficiently cooled such that the liquid nitrogen no longer vaporizes. Operation of the LNG fracturing pump is (229) is then stopped and conduit (23), valves (V42), (V14) and (V12) are checked for leaks. The LNG fracturing pump (229) is then operated to pressure and vaporize the liquid nitrogen with vapor directed to the flare for purging all air from the test system. A complete purge can be determined by placing an oxygen meter in the purge stream or by pumping the volumetric requirement to purge with a safety factor. Upon completing the purge, the LNG fracturing pump (229) is then stopped and valve (V6) is closed. All personnel clear the area and additional power is applied to the LNG fracturing pump (229) to pressure up the pump itself plus the conduit (24) treating line and the valves (V6), (V13) and (V15) to the required test pressure of 69,000 kPa. When at test pressure, the LNG fracturing pump (229) is then stopped and the tested components checked for leaks. At this time, vapor feed line conduit (32) is tested by opening valve (V11) to permit nitrogen pressure into the conduit. The vapor inlet valve (V22) to the LNG source tank (15) remains closed for the test to avoid pressuring of the LNG tank with nitrogen. Valve (V11) is manipulated to pressure test conduit (32) only to the pressure relief setting of the LNG source tank (15). Inert purging source (45) is then isolated from the system by closing valve (V12). Pressure is then released from the liquid line to the flare and the purge and pressure test are complete. The LNG tank source control valve (V42) is then opened and the valve (V6) opened to again allow flow to the flare line conduit (20).

The LNG fracturing pump (229) is then operated with an LNG feed to displace liquid nitrogen from the conduit (23) through the pump and conduits (24) and (25) to the flare line conduit (20) with natural gas. This ensures an LNG feed has been established to the LNG fracturing pump prior to beginning operations. The flare system (20) is tested at this time.

A pre-treatment safety and operations meeting is then held with all personnel. Site hazards are reviewed including location of safety equipment, safety areas, and the site evacuation plan. The operation meeting details the treatment procedures, equipment responsibilities, pressure maximums and any other treatment details specific to this well or fracture treatment operation.

The natural gas source (215), usually provided at or near atmospheric pressure, is pre-pressured to 350 kPa (50 psig) using the LNG Fracturing Pump (229) through vapor line conduit (232) with valves (V12) and (V22) opened to ensure adequate feed pressure during the fracturing operation. Once the system has been pressure tested for safety and the LNG source (215) pressured, under control of the controller (58), flare valve (V8) and natural gas line valve (V6) are closed. The liquid line valve (V5) and the well control valve (V7) are opened.

Fracture pumping operations are now begun according to the example Fracturing Treatment Program of Table 2. Equipment operation and valve manipulation is completed using controller (58) throughout the process ensuring personnel do not enter the high pressure hazard area during the treatment. The liquid fracturing fluid control valve (V1) is opened and fracturing blender (14) operated with high pressure slurry pump (16) to begin a liquid feed rate into the well at 0.5 m3/min to begin the hole fill. Chemicals, friction reducer and foaming surfactant, are added to the liquid stream at the required proportions under the control of controller (58). Properties of the created natural gas foam can be controlled in a number of ways. Altering the foam quality, proportion of natural gas to total volume, will change the density and viscosity of the resulting mixture. Altering the strength or concentration of the foaming surfactant will alter the gas bubble size and change the resulting viscosity of the foam. Changing the viscosity of the liquid phase by adding a viscosifier will alter the resulting viscosity of the foam. Valve (V6) is opened and LNG fracturing pump (229) is operated to begin injection of gaseous natural gas into the liquid stream. The liquid stream pumping is begun and established before the natural gas stream pump is operated to ensure natural gas is not inadvertently fed back to the liquid system. Controller (58) monitors the liquid feed rate and the natural gas addition rate via individual flow meters or pump stroke counters and adjusts the LNG fracturing pump (229) to maintain the correct natural gas to liquid ratio for a 75% quality foam. With a hole fill rate specified in this instance at a total rate of 2.0 m3/min foam, the LNG fracturing pump (229) is regulated to a rate of 468 sm3/min. This requires a LNG rate from the storage source (215) of 0.78 m3/min. Pumping to fill the wellbore is continued until 17.8 m3 of foam is pumped. The wellbore from surface to the perforations is now full of natural gas foam. Pumping is continued and pressure within the wellbore rises as additional volume is pumped until the formation break down pressure is reached and the underground fracture initiated. The hole is now filled, the fracture initiated and a feed rate into the underground fracture established. Total rate is then increased to the desired treating rate of 5.0 m3/min and the foamed pad injection begun. A liquid rate of 1.25 m3/min and a natural gas rate of 1170 sm3/min, requiring a feed rate of 1.96 m3/min of LNG, generate a total rate of 5.0 m3/min at the anticipated underground fracturing pressure of 45,189 kPa. As a compressible gas, the required natural gas rate at surface is based upon the down hole fracturing pressure and the target total rate. The compression of natural gas at 45,189 kPa and 90° C. is such that 312 sm3 of natural gas is required to create one m3 of space. In the event that the bottom fracturing pressure varies from that anticipated, the controller (58) adjusts the surface natural gas rate to maintain the proper down hole rate for a 75% quality foam. The natural gas foamed pad is continued until a total foam volume of 40 m3, 10 m3 of water at 75% quality, is pumped into the wellbore. The pad serves to extend and widen the underground fracture sufficiently to accept the proppant contained within the treatment steps following.

TABLE 2

Fracturing Treatment Program

Fracturing Treatment Program - 100 tonne Natural Gas Foamed Slick Water Frac

| Proppant 1 | 10 tonne 40/150 mesh sand | Density 1 | 2650 kg/m3 | Hole Volume | 17.8 m3 |
|---|---|---|---|---|---|
| Proppant 2 | 90 tonne 30/50 mesh sand | Density 2 | 2650 kg/m3 | Underflush | 0.5 m3 |
| Proppant Total | 100 tonne | | | Bottom Hole Fracturing Pressure = | 45,189 kPa |
| Total Rate | 5.0 m3/min | | | Bottom Hole Temperature = | 90 deg C. |
| Foam Quality | 75% | | | Natural Gas Vol Factor = | 312 sm3/m3 |

| | Slurry | Liquid | | | Proppant | | |
|---|---|---|---|---|---|---|---|
| Stage Description | Blender Rate (m3/min) | Liquid Rate | Liquid Volume (m3) | Cumulative Liquid Volume (m3) | Blender Concentration (kgSA/m3 liq) | Proppant Stage (tonne) | Cumulative Proppant (tonne) |
| Fill Hole | 0.50 | 0.5 | 4.5 | | | | |
| Pad | 1.25 | 1.25 | 10.0 | 10.0 | | | |
| Start 50/140 sand | 1.25 | 1.22 | 4.0 | 14.0 | 250 | 1.0 | 1.0 |
| Increase concentration | 1.25 | 1.19 | 6.0 | 20.0 | 500 | 3.0 | 4.0 |
| Increase concentration | 1.25 | 1.17 | 8.0 | 28.0 | 750 | 6.0 | 10.0 |
| Start 30/50 sand | 1.25 | 1.17 | 8.0 | 36.0 | 750 | 6.0 | 16.0 |
| Increase concentration | 1.25 | 1.14 | 8.0 | 44.0 | 1000 | 8.0 | 24.0 |
| Increase concentration | 1.25 | 1.12 | 20.0 | 64.0 | 1250 | 25.0 | 49.0 |
| Increase concentration | 1.25 | 1.10 | 34.0 | 98.0 | 1500 | 51.0 | 100.0 |
| Flush treatment | 1.25 | 1.25 | 4.3 | 102.3 | | | |

| | Natural Gas | | | Downhole Conditions | | |
|---|---|---|---|---|---|---|
| Stage Description | Nat'l Gas Rate (sm3/min) | Nat'l Gas Stage Volume (sm3) | Cumulative Nat'l Gas (sm3) | Total Rate (m3/min) | Conc @ Perfs (kgSA/m3 foam) | Foam Quality (—) |
| Fill Hole | 468 | 4165 | 4165 | 2.00 | | 75.0% |
| Pad | 1170 | 9360 | 13525 | 5.00 | 0 | 75.0% |
| Start 50/140 sand | 1143 | 3744 | 17269 | 5.00 | 63 | 75.0% |
| Increase concentration | 1117 | 5616 | 22885 | 5.00 | 125 | 75.0% |
| Increase concentration | 1093 | 7488 | 30373 | 5.00 | 188 | 75.0% |
| Start 30/50 sand | 1093 | 7488 | 37861 | 5.00 | 188 | 75.0% |
| Increase concentration | 1069 | 7488 | 45349 | 5.00 | 250 | 75.0% |
| Increase concentration | 1047 | 18720 | 64069 | 5.00 | 313 | 75.0% |
| Increase concentration | 1025 | 31824 | 95893 | 5.00 | 375 | 75.0% |
| Flush treatment | 1170 | 4048 | 99941 | 5.00 | 0 | 75.0% |

Treatment Fluid Requirements

| Fluid | | Fill Hole | Pad | Mix Proppant | Flush | Losses and Tank Bottoms | Total | |
|---|---|---|---|---|---|---|---|---|
| Natural Gas | (sm3) | 4,165 | 4,165 | 82,368 | 4,048 | 8,955 | 103,702 | sm3 |
| LNG | (m3) | 7.0 | 7.0 | 138.0 | 6.8 | 15.0 | 174 | m3 |
| Water | | 4.5 | 10.0 | 88.0 | 4.3 | 12.0 | 119 | m3 |
| Requires: | | | | LNG | 3 | tanks @ | 60 | m3 each |
| | | | | Water | 2 | tanks @ | 64 | m3 each |

Chemical Addition Schedule
Add to water portion only

| Fluid | Fill Hole Conc. | Pad Conc. | Mix Proppant Conc. | Flush Conc. | Tank Bottoms Conc. | Total |
|---|---|---|---|---|---|---|
| Continuous Mix Chemicals | | | | | | |
| Friction Reducer (L/m3) | 1.0 | 1 0 | 1 0 | 1.0 | | 106.8 L |
| Foaming Surfactant (L/m3) | 3.0 | 3.0 | 3.0 | 0.0 | | 307.4 L |
| Pre-Mixed Chemicals | | | | | | |
| NONE | | | | | | |

As per the treating program, proppant is begun by opening the proppant supply valve (V2) initiating flow of proppant into the fracturing blender (14). In this example sand of varying mesh sizes is used; however any other natural or manmade proppant can be applied in the same manner. The rate of proppant flow into the blender is controlled through augers, belts or sliding gates to achieve the correct proportion of proppant in the liquid stream. In this fracture treatment program design, the fracturing blender (14) and high pressure slurry pump (16) rate remains constant so that the water rate is reduced by the rate of the added proppant. To maintain the foam quality and total foam injection rate required, the natural gas rate is adjusted. In this case to maintain the bottom hole rate, the liquid rate is reduced from 1.25 m3/min to 1.22 m3/min and the natural gas rate is decreased from 1,170 sm3/min to 1,143 sm3/min to account for the added proppant. The treatment program is continued with sand concentrations increasing with adjustment of the water and natural gas rates until sufficient proppant has been pumped. If a screen out occurs, that being the proppant within the wellbore or the down hole fracture bridges to the degree such that injection is restricted and pressures increase beyond the allowable maximum, all injection will be stopped and attempts to re-initiate injection should not be considered. Once the proppant has been pumped, the well is flushed which displaces the proppant through the surface equipment, down the wellbore and into the underground fracture. The well should be flushed with the specified foam volume as calculated with an underflush set at 0.5 m3 for this example. During flush, should the underground fracturing pressure differ from that anticipated, the volume of natural gas pumped within the flush will need to be adjusted for the changed compressibility to ensure the correct flush volume is pumped. Upon flushing the well all equipment is shutdown, valve (V7) closed, the instantaneous shut-in pressure recorded and all equipment and materials sources secured. All pressure in the treating lines conduit and pumping equipment is released through to the conduit flare line (20) and the natural gas containing equipment purged with nitrogen. The natural gas fracturing equipment is then rigged out. Note that the foam quality of 75% presented in this example is only one possible value for foam quality and depending upon well requirements, foam qualities from under 60% to over 95% can be used. Further, the amount of natural gas applied or the foam quality used in the pad, to carry proppant or to flush the well can be individually varied. Further, this treatment design is based upon maintaining a constant blender rate. Proppant concentration can also be changed by adjusting the blender rate while compensating with the natural gas rate to generate a different foam quality but still maintain the same overall injection rate. In fact, proppant may not be employed at all, as desired.

Following rigging out of the fracturing equipment and at a time deemed suitable for the well being fractured, the well is flowed to clean up and evaluate. The natural gas foam is timed to break for the flow back such that the natural gas and water are no longer tightly intermingled in the form of stable foam. Rather, the water and natural gas are simply and randomly commingled. Breaking of the foam can be achieved through a number of methods, for example by degradation or removal of the foaming surfactant. Degradation may include disassociation of the surfactant foaming molecule by thermal breakdown or by chemical attack. Removal of the foaming surfactant from the liquid phase is typically achieved by sorption of the molecule onto solids such as the contacted reservoir rock. Breaking of the natural gas foam may also be accompanied by a controlled reduction in viscosity of the liquid phase. Flow back of the well following fracturing is accomplished by reducing the pressure at the wellhead to permit the fracturing fluids to flow from the well, created fracture and reservoir, thereby opening a flow path for the reservoir oil and gas to flow. Within the reservoir, the reduction of pressure allows the natural gas to expand and works to force the liquid phase of the fracture fluid from the reservoir and the fracture. Expansion of the natural gas also ensures a gas phase exists within the reservoir and created fractures. This gas phase provides permeability to gas within the near reservoir area plus reduces the capillary pressures holding the liquid phase in the reservoir matrix. A further benefit is achieved with solubility of the natural gas in the liquid phase resulting in reduced surface tension. This mechanism can further reduce capillary pressure and improve relative permeability. Within the wellbore, reduction of pressure allows the natural gas to expand and further reduce the density of the commingled natural gas and liquid column in the wellbore. This reduced density serves to enhance flow of natural gas and liquid up the wellbore reducing the bottom hole flow pressure. The reduced bottom hole pressure allows a higher differential pressure between the reservoir and the wellbore permitting a higher drawdown pressure to improve movement of the fracturing fluid from the reservoir and into the wellbore. The flow of the liquid phase out of the reservoir and created fractures is thereby enhanced ensuring a liquid block does not occur.

The injected natural gas and fracturing fluid liquids released from the well are diverted to the phase separator (60) where gases, liquids and solids can be separated. Produced solids may include the fracturing proppant and are accumulated within the separator vessel (60) and removed as needed for space considerations. Liquids are accumulated within the separator (60) and drained into storage vessels, not shown. During the flow for clean-up and evaluation, injected and reservoir based natural gas are directed from the separator vessel (60) to the flare stack (20) or preferentially diverted to the gas pipeline (21) for resale. The use of natural gas as the gas phase energizer permits diversion to the gas pipeline and fracture clean-up without the need to flare. Additionally, the use of natural gas permits immediate sale of the injected natural gas or reservoir based gas. As a further consideration, the above example utilizes only approximately 110 m3 (229,000 gallon) of water whereas placement of the same treatment without energization would require in excess of 430 m3 (113,000 gallon) water. Replacement of a similar water volume with the conventional gases carbon dioxide or nitrogen would require either significant flaring or scrubbing from produced gas prior to achieving a typical specification for gas sale. Foam quality can be increased beyond 75% to further reduce water consumption. These aspects reduce environmental impact and improve economics.

Comparable methods using the same approach as above is within other embodiments and is applicable to other types of fracturing treatments and applications including energized and mist fracturing fluids; with and without proppants; with and without fracturing liquids such as acids, waters, brines, methanol, and hydrocarbons; and for use in all reservoir types including tight oil and gas, coal bed methane, shale oil and gas and conventional oil and gas recovery.

Various modifications to those embodiments will be readily apparent to those skilled in the art. The present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

What is claimed is:

1. A system for generating an energized fracturing fluid mixture for hydraulically fracturing a downhole formation, the system comprising:
   (a) a fracturing base fluid source;
   (b) a base fluid pump fluidly coupled to the fracturing base fluid source, and configurable to pressurize a liquid base fluid to at least a fracturing pressure of a formation;
   (c) a liquefied natural gas ("LNG") source;
   (d) an LNG pump assembly fluidly coupled to the LNG source and comprising a pump component configurable to pressurize LNG to at least the fracturing pressure, and a heater component configurable to vaporize pressurized LNG to a gaseous phase; and
   (e) a fracturing fluid mixer having a first inlet fluidly coupled to the base fluid pump, a second inlet fluidly coupled to the LNG pump assembly and an outlet for coupling to a wellhead, and for mixing the liquid base fluid and gaseous natural gas to form a fracturing fluid mixture for injection into the wellhead.

2. A system as claimed in claim 1 wherein the pump component comprises at least one cryogenic centrifugal pump.

3. A system as claimed in claim 2 wherein the pump component comprises a high pressure LNG pump fluidly coupled to the at least one cryogenic pump and being rated to at least the fracturing pressure of the formation.

4. A system as claimed in claim 1 wherein the heater component comprises at least one heat exchanger fluidly coupled to the pump component to receive pressurized LNG, and thermally coupled to a heat source capable of heating the pressurized LNG to at least form the gaseous phase LNG.

5. A system as claimed in claim 1 wherein the heater component is a flameless catalytic heater.

6. A system as claimed in claim 5 wherein the flameless catalytic heater comprises at least one catalytic element fluidly communicable with and capable of oxidizing a fuel gas to generate heat, and a LNG conduit thermally coupled but fluidly separated from the catalytic element and for flowing LNG therethrough.

7. A system as claimed in claim 6 wherein the flameless catalytic heater comprises multiple catalytic elements arranged concentrically around the LNG conduit forming a catalytic bundle for a single pass through of LNG through the flameless catalytic heater.

8. The system as claimed in claim 1 wherein the mixer includes a main flow line including an inlet end and an outlet end, an elbow conduit connected to and in fluid communication with the main flow line between the inlet end and the outlet end, the elbow conduit extending at an acute angle from the inlet end and a substantially linear flow path through the main flow line, the inlet end connected to receive flow of the base fluid from the base fluid pump and the elbow conduit connected to receive flow of the natural gas from the LNG pump assembly.

9. The system as claimed in claim 1 wherein the LNG source comprises at least one LNG tank, and the system further comprises a gaseous natural gas return conduit fluidly coupled to the heater component and the tank for feeding pressurized gaseous natural gas to the tank to pressurize the tank.

10. The system as claimed in claim 9 further comprising a flare, a flare line conduit fluidly coupled to the flare and a pressure relief valve fluidly coupling the flare line conduit to the tank such that gaseous natural gas in the tank can be vented to the flare.

11. The system as claimed in claim 9 further comprising a cryogenic inert gas source, an inert gas expander liquefaction unit fluidly coupled to the inert gas source and having an inlet valve fluidly coupled to the tank to receive gaseous natural gas from the tank and an outlet valve coupled to tank to deliver LNG to the tank, the inert gas liquefaction unit configured to allow a cryogenic inert gas to vaporize therein and cause sufficient cooling to liquefy gaseous natural gas therein into LNG.

12. The system as claimed in claim 1 wherein the LNG source comprises multiple LNG tanks, an intertank vapour line conduit fluidly coupled to each tank, and an intertank liquid line conduit fluidly coupled to each tank.

13. The system as claimed in claim 1 wherein the fracturing base fluid source comprises a supply of a fracturing liquid, and optionally at least one of a proppant and a fracturing modifier chemical.

14. The system as claimed in claim 13 wherein the fracturing base fluid source includes at least one of the proppant and the fracturing modifier chemical and the system further comprises a blender to blend the base fluid and at least one of the proppant and fracturing modifier chemical upstream of the mixer.

15. A method for hydraulically fracturing a downhole formation, comprising:
   (a) providing a liquid base fluid and pressurizing the base fluid to at least a fracturing pressure of the formation;
   (b) providing liquefied natural gas (LNG) and pressurizing the LNG to at least the fracturing pressure then heating the LNG until the LNG is vaporized to a gaseous state;
   (c) mixing the pressurized liquid base fluid and pressurized gaseous natural gas to form a hydraulic fracturing fluid mixture;
   (d) injecting the fracturing fluid mixture through a wellhead and into a well in communication with the formation; and
   (e) continuing to inject the fracturing fluid mixture until the formation is fractured.

16. The method as claimed in claim 15 wherein the fracturing base fluid comprises a fracturing liquid, and optionally at least one of a proppant and a fracturing modifier chemical.

17. The method as claimed in claim 16 wherein the fracturing base fluid includes at least one of the proppant and the fracturing modifier chemical and the method further comprises blending the fracturing liquid with the at least one proppant and fracturing modifier chemical prior to mixing the liquid base fluid with the gaseous natural gas.

18. The method as claimed in claim 15 wherein the hydraulic fracturing fluid mixture is a foam.

19. The method as claimed in claim 15 wherein the LNG is provided from at least one LNG tank and the method further comprising venting gaseous natural gas in the LNG tank to a flare.

20. The method as claimed in claim 15 wherein the LNG is provided from at least one LNG tank and the method further comprises receiving gaseous natural gas from the LNG tank and cooling the gaseous natural gas into LNG by vaporizing a cryogenic inert gas and contacting the vaporized inert gas with the gaseous natural gas.

* * * * *